[19] United States Patent
Morris et al.

[11] 3,899,028
[45] Aug. 12, 1975

[54] ANGULAR POSITION SENSING AND CONTROL SYSTEM, APPARATUS AND METHOD

[75] Inventors: Harold D. Morris; Frederick J. Sigworth, both of Orinda, Calif.

[73] Assignee: Systron Donner Corporation, Concord, Calif.

[22] Filed: Aug. 28, 1973

[21] Appl. No.: 392,257

Related U.S. Application Data

[63] Continuation-in-part of Ser. No. 239,660, March 30, 1972, abandoned.

[52] U.S. Cl. ................................................. 172/4.5
[51] Int. Cl. ................................................... E02f 3/76
[58] Field of Search ............ 172/4.5, 2; 73/488, 517

[56] References Cited
UNITED STATES PATENTS

| | | | |
|---|---|---|---|
| 3,477,152 | 11/1969 | Ask | 172/2 X |
| 3,486,564 | 12/1969 | Page et al. | 172/4.5 |
| 3,610,341 | 10/1971 | Swisher | 172/4.5 |
| 3,637,026 | 7/1972 | Snow | 172/4.5 |
| 3,786,871 | 1/1974 | Long et al. | 172/4.5 |
| 3,791,452 | 2/1974 | Long et al. | 172/4.5 |

Primary Examiner—Stephen C. Pellegrino
Attorney, Agent, or Firm—Flehr, Hohbach, Test, Albritton & Herbert

[57] ABSTRACT

A structural body is monitored in angular position about at least one axis by utilizing a level sensor and a sensor responsive to angular motion of the body about the axis being monitored. An output indicative of long term angular variations of the body about the axis is provided by the level sensor and short term angular variations are indicated by the output from the sensor responsive to angular motion about the axis. The signals indicative of long term and short term angular variations are combined to provide a broad band output signal indicative of angular position which is immune to high frequency translational variations appearing at the level sensor output, but which is responsive to high frequency angular inputs. The fast response angular sensor output is compared with the slow response level sensor output and an error signal is produced which drives the angular sensor output signal into coincidence with the level sensor output signal. The combined broad band angular output indication may be utilized for angular position monitoring for controlling one part of a machine relative to a predetermined external angular position reference for driving a stable platform to assume a predetermined angle about the axis.

50 Claims, 23 Drawing Figures

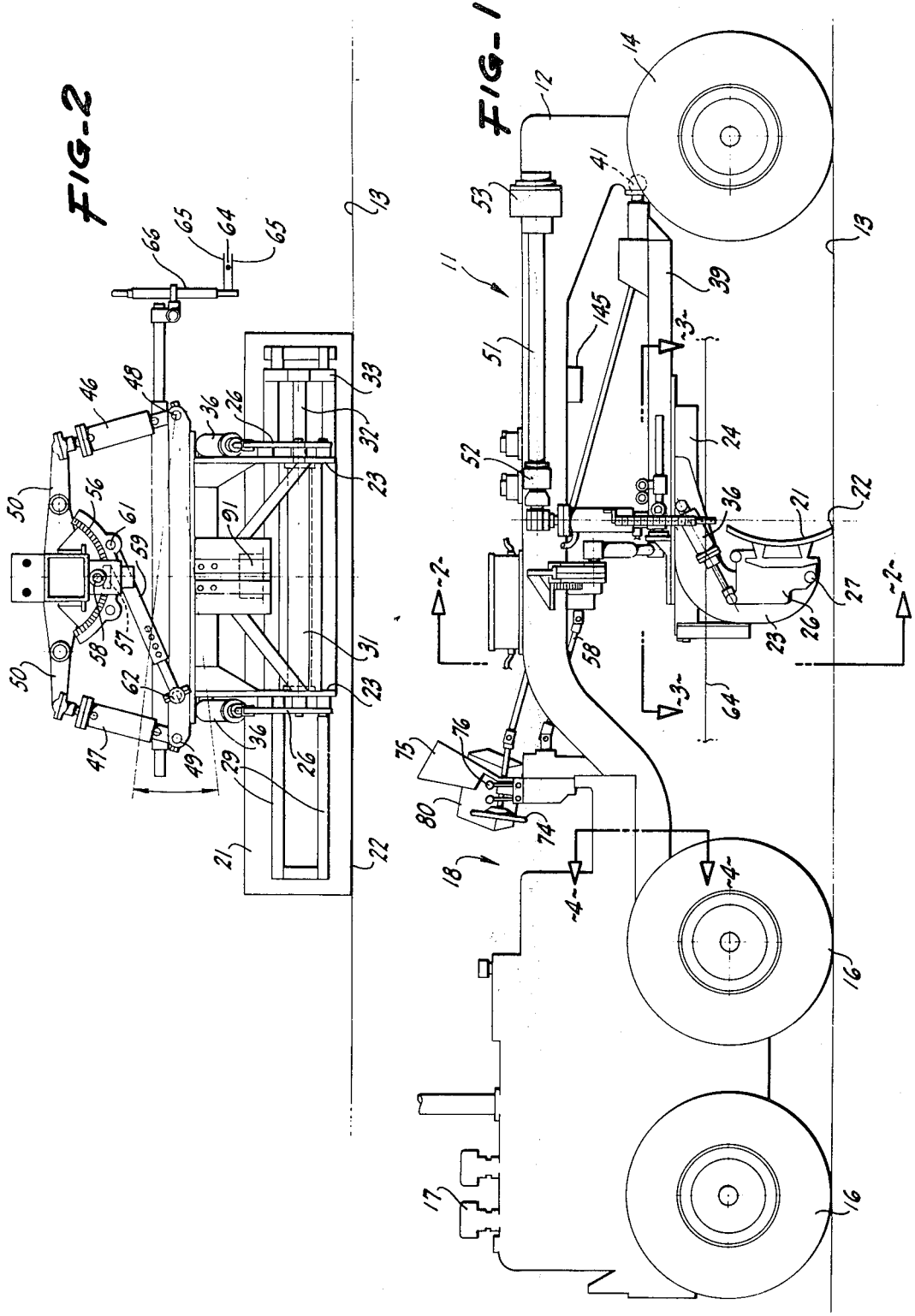

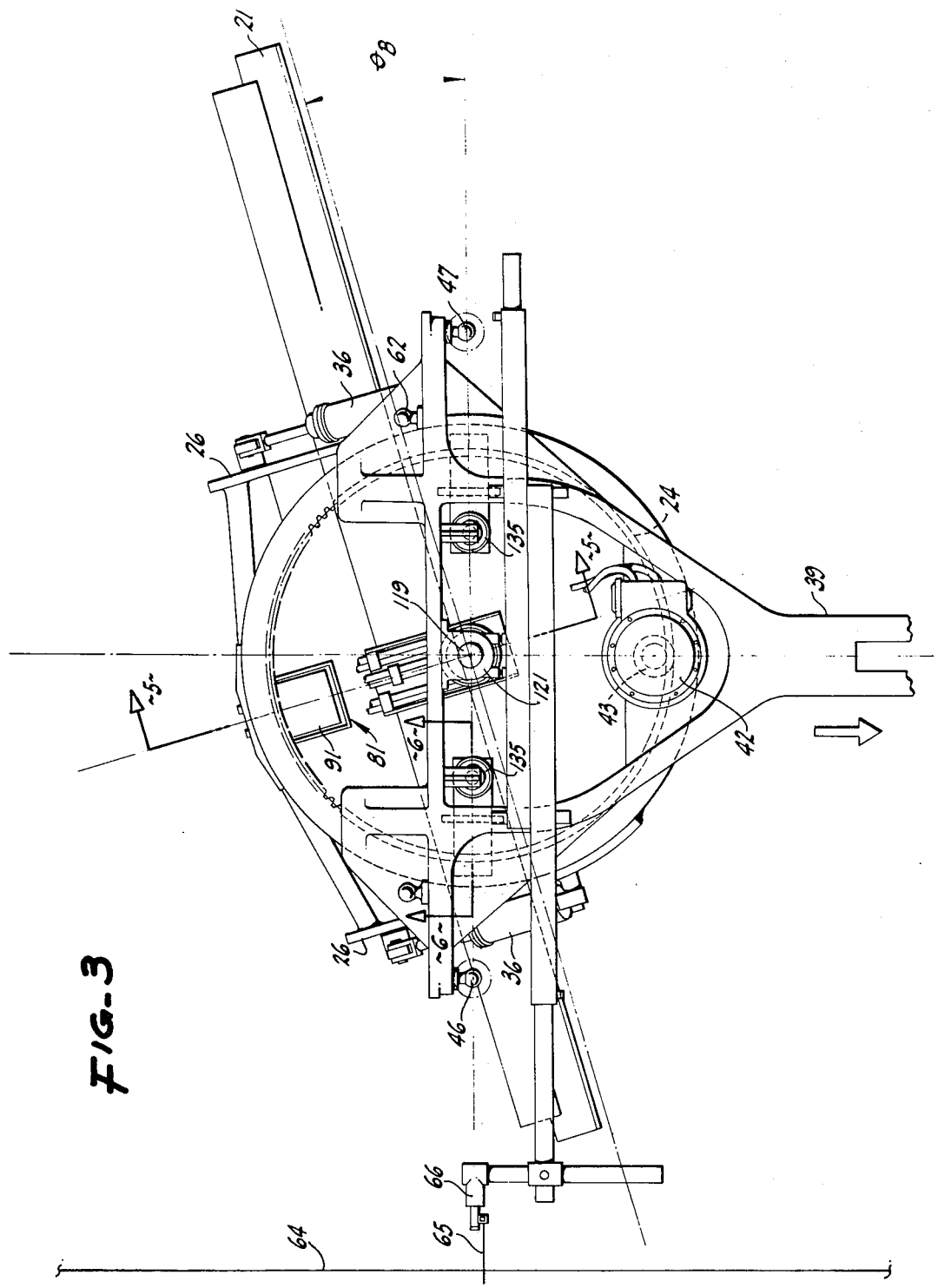

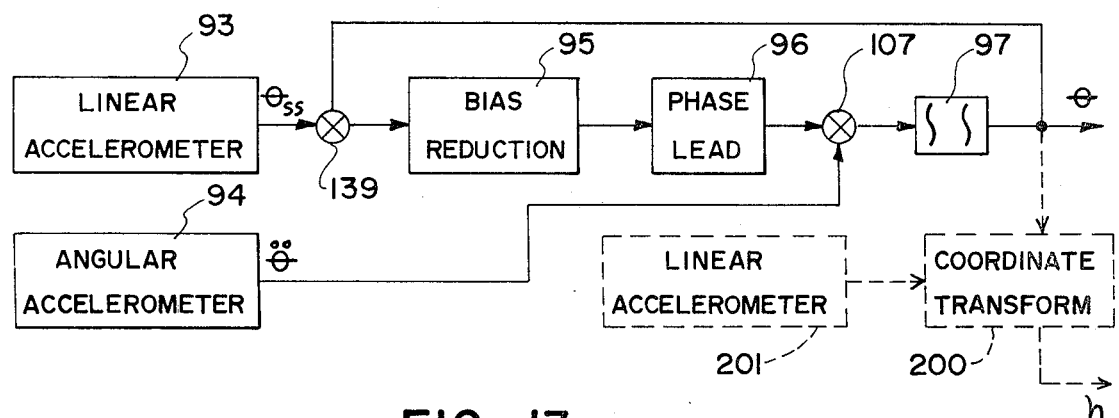
FIG.-13
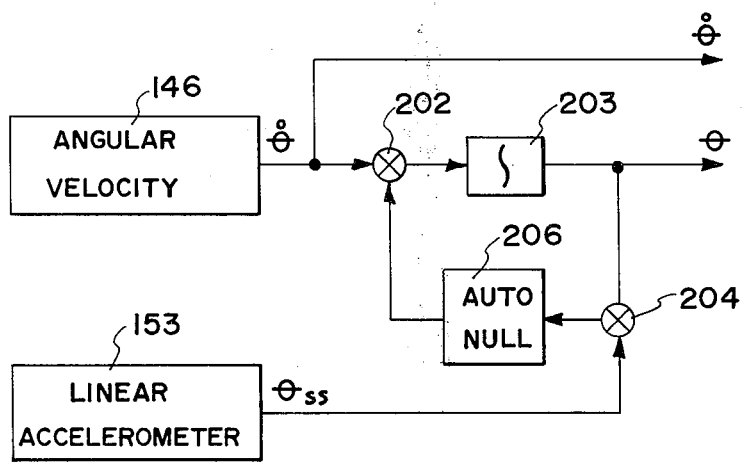
FIG.-14
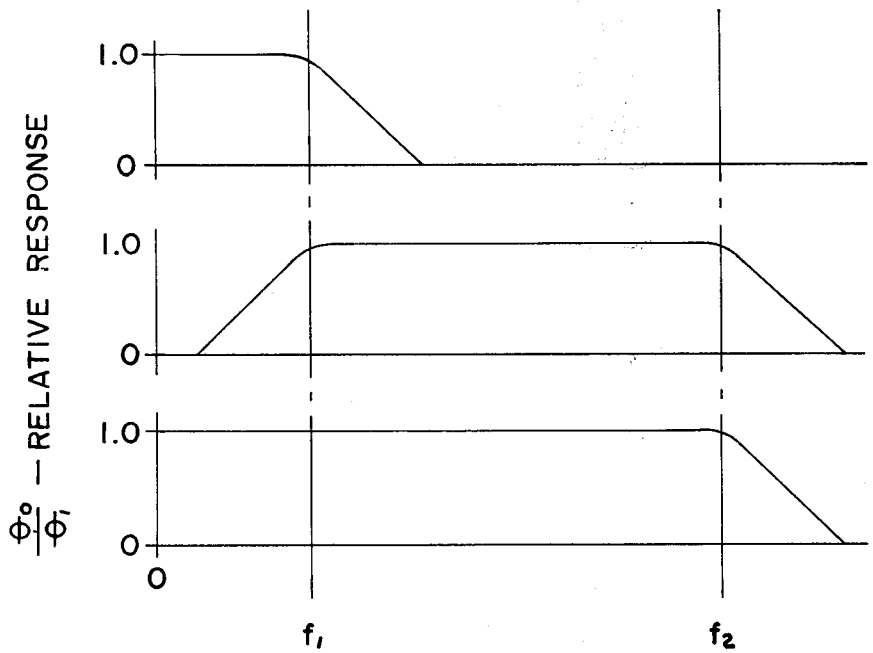
FIG.-15
FIG.-16
FIG.-17

3,899,028

ANGULAR POSITION SENSING AND CONTROL SYSTEM, APPARATUS AND METHOD

This is a continuation-in-part of application Ser. No. 239,660 filed Mar. 30, 1972, now abandoned.

BACKGROUND OF THE INVENTION

1. Field of the Invention

This invention relates to an angular position sensing and control system and more particularly to such a position sensing system for monitoring the orientation of a structural body relative to a gravity established local horizontal reference for stabilizing a structural body mounted platform relative to the local horizontal reference.

2. Description of the Prior Art

Difficulty has been experienced in the past in monitoring the angular orientation of a structural body with reference to earth's coordinates and in controlling a platform or other movable part mounted within the body to maintain a predetermined orientation referenced to earth coordinates while the structural body is experiencing three dimensional angular and translational motion. The usual approach for monitoring orientation or stabilizing a platform involves the use of a vertical gyro with its attendant disadvantages stemming from its relatively short operating life and deterioriating accuracy as the spinning rotor and gimbal bearings deteriorate with extended use. The wear out life time of the vertical gyro represents a serious and significant problem of periodic replacement as well as a danger of loss of data or erroneous platform position control due to untimely and unexpected gyro failure modes.

Attempts have heretofore been made to control the attitude of one part of a machine with respect to some reference. For example, attempts have been made to control the attitude of a blade of a motor grader by utilizing electrolytic potentiometers or linear accelerometers to provide a gravity-referenced local horizontal. This served to sense linear acceleration only, and it has been found that such a system has numerous disadvantages. For example, lateral movements of the entire road grader produced a command signal to the blade tilt control which made the hydraulic system move one end of the blade up and down, which in turn shook the machine from side to side, so that in fact the motor grader was oscillatory at the natural frequency of the grader. For this and other reasons, it has been found necessary to limit the speed of response of the attitude control system and to operate such modified graders at very low speeds, on the order or 1 mile per hour.

At the present time, road graders are being operated with the blade controlled manually by the operators. This requires extreme skill on the part of the operators, because it is necessary for them to control blade elevation and cross-grade angle simultaneously. Thus, the operator has to pay very close attention to the position of both the right and left ends of the blade, which presents great difficulty because the operator is in the operator's station elevated a substantial distance over the blade.

There is a need for an angular position sensing and control system which is not subjected to the stringent structural requirements placed on component parts associated with the high angular velocity spinning rotor of a gyro, and which does not require the ultra low torque bearing supports associated with gyro gimbals. A new apparatus and method is needed which may be utilized for controlling the angular movement about an axis of one part of a structural body or machine relative to a gravityreferenced local horizontal plane.

SUMMARY AND OBJECTS OF THE INVENTION

The angular position sensing system is mounted within a structural body having at least one selected axis about which angular rotation may occur. The system contains a level sensor and an angular motion detector for each selected axis.

The level sensing means is separate from the angular motion detector means and outputs from the two last named means are directed to a combining network. Only long term level sensor signals are accepted by the combining network and only short term angular motion signals are sensed by the angular motion detector. The long term signals roll off above a low corner frequency and the short term signals roll off below the low corner frequency. The sensing system is referenced to earth coordinates and provides a broad band output from the combining network related to angular orientation of the body within the earth coordinate system. The combined signal may be utilized to monitor the angular orientation of the structural body, or alternatively may be utilized in conjunction with a command signal to control the orientation of a rotatable part mounted on the body with reference to the system of earth's coordinates.

In the method which is utilized for sensing angular position of a structural body or controlling one part of such a body relative to a local horizontal plane as the body moves relative to a surface, a reference command may be provided for controlling the movement of said one part. Deviation from local horizontal of said one part is measured along the axis extending at right angles to the axis for tilting movement. Angular motion of said one part is measured along an axis parallel to the axis of rotation. The deviation from local horizontal and angular motion measurements are combined selecting the low frequency deviation measurements and the high frequency angular motion measurements. The combined measurements provide a broad band measurement of angular position. The combined measurements may be compared with the reference command to provide an error signal. The error signal is utilized for causing angular movement of said one part in accordance with the reference command.

In general it is an object of the present invention to provide an angular position sensor and control system and method which indicates the angular orientation of a structural body about at least one axis referenced to earth's coordinates.

It is another object of the present invention to provide an angular position sensor for use with a vertical displacement sensor mounted on the structural body which together with coordinate transformation means provides an indication of vertical displacement of the body.

It is another object of the present invention to provide an angular position sensing system for mounting on a stable platform supported by the structural body which replaces the relatively short lived vertical gyro for stabilizing the platform relative to earth's coordinates.

It is another object of the present invention to provide an angular position sensor and control system and method utilizing the long term angular position indications of a sensor susceptible to short term error and the short term angular position indications of a sensor susceptible to long term error for providing a combined wide band indication of angular orientation.

It is another object of the present invention to provide an angular position sensor and control system and method which is not limited by the life and failure modes of the spinning rotor gyroscope.

It is another object of the present invention to provide an angular position sensor and control system and method which may be strapped down to a structural body for measuring large angles of deviation relative to earth's coordinates as low frequencies in the presence of three dimensional translational inputs.

It is another object of the present invention to provide an angular position sensor and control system and method which will accurately measure vertical translation in the presence of random horizontal translation components and angular motion.

It is another object of the present invention to provide an angular position sensor and control system, apparatus, and method for controlling the angular movement about an axis of one part of a structural body relative to a gravity-referenced local horizontal plane as the body moves relative to the reference.

Another object of the invention is to provide an angular position sensor and control system, apparatus, and method which will automatically control angular movement of one part of a structural body in response to a reference command.

Another object of the invention is to provide an angular position sensor and control system, apparatus, and method in which linear acceleration of said one part in a direction at right angles to the axis of tilting movement is measured and angular acceleration of said one part is measured on an axis parallel to the axis for tilting movement.

Another object of the invention is to provide an angular position sensor and control system, apparatus and method which is particularly applicable and controlling the attitude of the blade of a motor grader.

Another object of the invention is to provide an angular position sensor and control system, apparatus and method which does not excite the lateral oscillatory mode of a motor grader.

Another object of the invention is to provide an angular position sensor and control system, apparatus and method which permits relatively high speed operation of the motor grader.

Another object of the invention is to provide an angular position sensor and control system, apparatus and method which can be utilized for cutting the same cross grade even when the blade angle is changed about a vertical axis.

Another object of the invention is to provide an angular position sensor and control system, apparatus and method which can accommodate slippage of the drive wheels of the motor grader.

Another object of the invention is to provide an angular position sensor and control system, apparatus and method which utilizes a gravity reference rather than the reference established by the wheels of the motor grader.

Another object of the invention is to provide an angular position sensor and control system, apparatus and method which permits operation of the road grader utilizing less skilled personnel.

Another object of the invention is to provide an angular position sensor and control system, apparatus and method which responds almost instantaneously to displacement due to varying forces on the blade of the motor grader while still keeping it at the commanded angle immune to the effects of vertical or lateral linear oscillations of the grader on its rubbere tires.

Another object of the invention is to provide an angular position sensor and control system, apparatus and method in which the motor grader can be operated to hold a precise crossgrade angle at speeds ranging up to and possibly exceeding eight miles per hour.

Additional objects and features of the invention will appear from the following description in which the preferred embodiments are set forth in detail in conjunction with the accompanying drawings.

BRIEF DESCRIPTION OF THE DRAWINGS

FIG. 1 is a side elevational view showing a motor grader of a type utilizing a control system and apparatus incorporating the present invention.

FIG. 2 is a cross sectional view taken along the line of 2—2 of FIG. 1.

FIG. 3 is a cross sectional view taken along the line of 3—3 of FIG. 1.

FIG. 13 is a block diagram of an angular position sensor including a linear accelerometer and an angular accelerometer combination.

FIG. 14 is a block diagram of an angular position sensor including a linear accelerometer and an angular velocity sensor combination.

FIG. 15 is a typical response curve at the output of the combining network for a level sensor.

FIG. 16 is a typical response curve at the output of the combining network for an angular motion detector.

FIG. 17 is a combination response curve at the output of the combining network for the angular position sensor.

DESCRIPTION OF THE PREFERRED EMBODIMENTS

Figure 5:
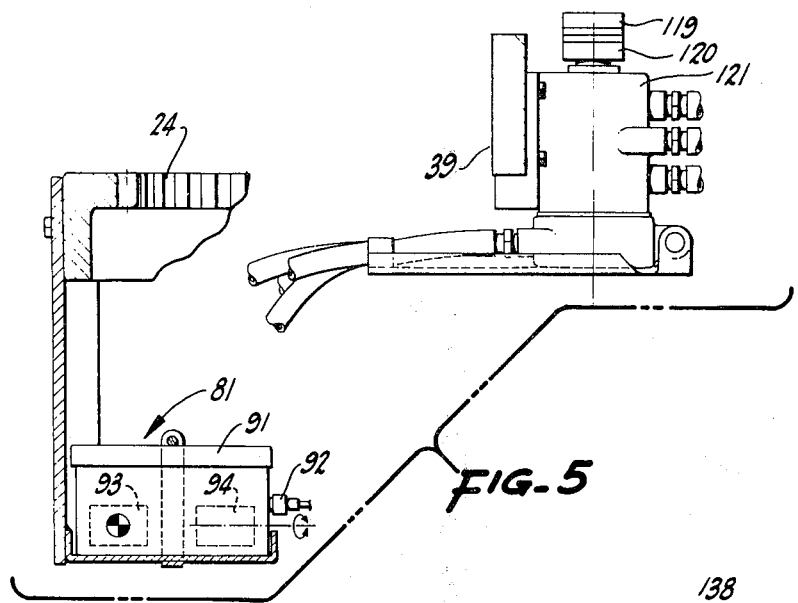
FIG. 5 is a cross sectional view taken along the line of 5—5 of FIG. 3.

The invention disclosed herein is useful in several broad areas. The angular position sensing system may be mounted directly to the frame of a structural body for providing indication of body pitch and roll angles relative to a local horizontal plane. Such a configuration is termed a "strap-down" application. When combined with a strap-down sensor having its sensitive axis aligned along the nominally vertical body axis and a coordinate transformation circuit, the strap-down system provides a true indication of structural body vertical displacement. The angular position sensor may also be mounted on a platform mounted within the structural body and capable of rotation relative to the body about one or more axes. Such a configuration senses platform deviation from a predetermined orientation relative to earth's coordinates. The sensed deviation may be used to generate an error signal for stabilizing the platform in a predetermined orientation. The platform may take the form of a rotatable part attached to the structural body or machine which may be desired to be controlled in attitude relative to earth's coordinates while the structural body or machine moves randomly within the coordinate system. The angular position sensor and control system is useful for control purposes with very low perturbation frequencies over large angles of deviation between the structural body and the referenced coordinate system.

The angular position sensing and control system apparatus incorporating one embodiment of the present invention is shown in FIG. 1 as being utilized on a motor grader 11. The motor grader 11 which is shown in the drawings is substantially of a conventional type as, for example, the CAT 16 motor grader manufactured by the Caterpillar Tractor Company of Peoria, Ill. As is well known to those skilled in the art such a motor grader consists of generally a framework 12 adapted to travel on a surface 13. For this purpose the framework 12 is provided with surface engaging means in the form of a pair of front wheels 14, and driven surface engaging means in the form of four rear driving wheels 16. Motive means is provided for supplying power to the rear driving wheels 16 and consists of a diesel engine 17 generally overlying the rear wheels 16. An operator's control and driving station 18 is provided on the framework 12 immediately ahead of the engine 17.

A blade or mold-board 21 forms a part of the motor grader. The blade 21 is of a suitable length such as 16 feet and is provided with a cutting edge 22. Means is provided for mounting the blade 21 on the framework 12 and consists of a pair of spaced arms 23 which are mounted on a large ring gear 24 that is generally disposed in a horizontal position. Mounting brackets 26 are pivotally connected to the lower extremities of the arms 23 by mounting bracket pivot bolts 27. The mounting brackets 26 carry shoes (not shown) which receive rails 29 which are secured to the rear side of the blade 21 and which permit sliding movement of the rails 29 in the shoes. Means is provided for shifting the blade 21 laterally on the arms 23 and the brackets 26 and consists of a cylinder 31 which has a piston rod 32 secured to a bracket 33 mounted on the rails 29. By the application of hydraulic fluid pressure to the cylinder 31 it can be seen that the blade 21 can be shifted laterally with respect to the arms 23.

Means is provided for causing tilting or rocking movement of the mounting brackets 26 and blade 21 carried thereby about a transversely extending axis passing through the pivot bolts 27. Such means consists of hydraulic actuators 36 which are pivotally connected to the brackets 26 and to the arms 23.

The ring gear 24 is carried by the rear extremity of a draw bar 39 which is in the form of a modified "A" frame construction. The draw bar 39 is pivotally connected to the front extremity of the framework 12 by a ball joint 41. Means is provided for rotating the ring gear 24 relative to the rear extremity of the draw bar 39 and consists of a hydraulic motor 42 which drives a pinion gear 43 that engages the ring gear 24.

Means is provided for supporting the rear extremity of the draw bar 39 and the ring gear 24 carried thereby relative to the framework 12. Such means consists of linkages in the form of hydraulic actuators 46 and 47 which are pivotally connected to the rear extremity of the draw bar 39 by suitable means such as bolts or pins 48 and 49 respectively, and which are also pivotally connected to rocker arms 50. The rocker arms 50 are secured to shafts 51 that rotate in bushings 52 mounted on the framework 12. The shafts 51 are adapted to be driven by hydraulic motors 53. It should be appreciated in connection with the present invention that the hydraulic actuators 46 and 47 have been substituted for mechanical linkages which previously have been provided as standard equipment on the CAT 16 motor grader. As hereinafter described it can be seen that the motors 53 are utilized for controlling the coarse elevation and the coarse cross-grade angle of the blade 21.

Means is also provided for shifting the blade 21 to the side and consists of a curved side-shifting rack 56 which is mounted for rotational movement about an axis which is parallel to the longitudinal axis of the frame 12. The rack is driven by a pinion 57 that is driven by a shaft 58. The shaft 58 is driven by a hydraulic motor (not shown). A linkage 59 connects the rack 56 to the rear extremity of the draw bar 39, and is pivotally connected to the rack 56 at a pivot point 61 and to the draw bar 39 at a pivot point 62.

Once shifted to the side as described above, means is available to bring the blade 21 into a vertical position on the side to which shifted. It can be seen from the foregoing that the blade 21 is capable of being displaced relative to the framework 12 either laterally or vertically, or tilted about the draw bar 39 axis, or rotated about two mutually perpendicular axes which are perpendicular to the tilt axis, or positioned through any combination of the above displacements.

Means is provided for forming an elevation reference of a conventional type and consists of an elevation reference command potentiometer 63, an external elevation reference wire 64, and a wand 65 supported by a member 66, which is in turn mounted on the draw bar 39. Mechanical motion of the wand 65 is transmitted by linkage to the movable member of an elevation reference potentiometer 67. Alternative means to the reference wire 64 for providing an elevation reference may consist of a rolling wheel (not shown) mounted on the framework 12 and connected mechanically to the movable member of the elevation reference potentiometer 67. The wheel is adapted to travel on a reference elevation track (not shown).

Figure 8:
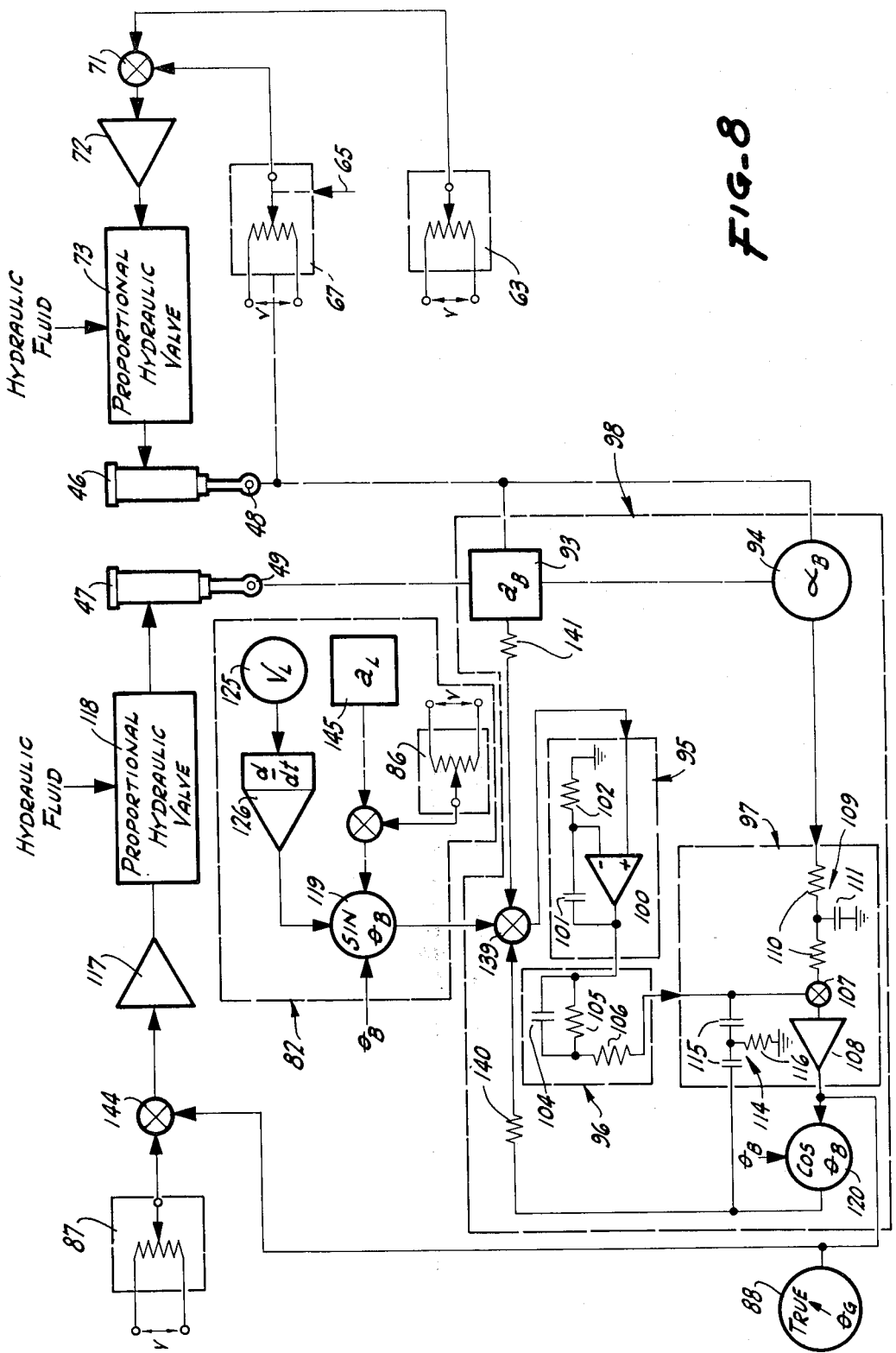
FIG. 8 is a circuit diagram partially in block form showing one form of the control system and apparatus incorporating the present invention.
Figure 9:
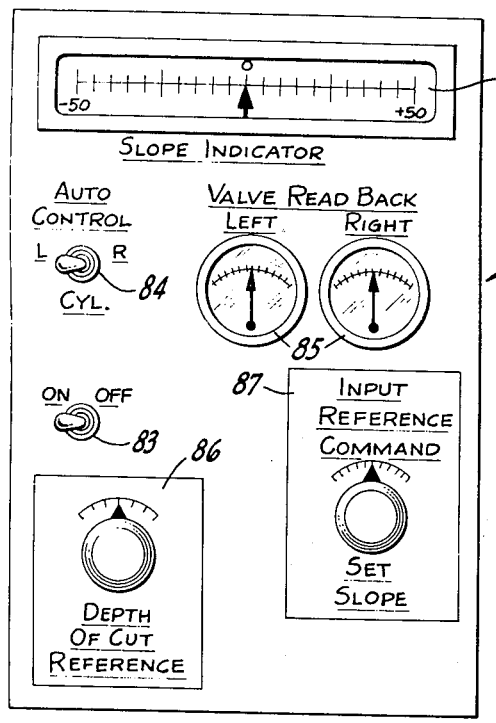
FIG. 9 is a front elevational view of the front panel of the control console utilized as part of the apparatus.

Means is provided to control the blade 21 in elevation and consists of means for receiving the elevation command signal from the elevation reference command potentiometer 63, such as the summing junction 71 as shown in FIG. 8. The junction 71 is connected to a servo amplifier 72 that is mounted on the framework 12, which is in turn connected to a proportional hydraulic valve 73 also mounted on the framework 12. The hydraulic valve 73 is, for the purpose of this embodiment, connected to the hydraulic actuator 46 which is mounted as a variable linkage between the framework 12 and the blade 21.

As explained previously, an external elevation reference means such as the wire 64 is provided. Means is also provided to sense the external elevation reference 64 such as the wand 65. The wand 65 is carried in its mounting member 66 and is connected to the elevation reference potentiometer 67. The output of the elevation reference potentiometer 67 is connected to the junction 71 which also receives the signal from the elevation reference command potentimeter 63.

The driving station 18 is provided with the various controls for the operator. There is provided a steering wheel 74 for guiding the vehicle, and a control console 75 as well as a plurality of levers 76 which can be utilized for controlling the hydraulic motors and other controls of the motor grader, as is well known to those skilled in the art. As is also well known to those skilled in the art, a complete hydraulic system is provided as part of the motor grader 11 and includes the appropriate hydraulic fluid supply, pumps, valves and the like. Similarly, the motor grader 11 also includes an electrical system comprised of generators, batteries and the like.

The portions of the motor grader 11 thus far described are conventional with the exception of the hydraulic actuators 46 and 47 which have been substituted for mechanical linkages as hereinbefore described. The control system which forms a part of the present invention and which is adapted to be mounted on the motor grader 11 for use therewith, includes a system control console 80, a position sensing assembly 81, and an error correction means 82.

The system control console 80 is mounted in the driving station 18 so it is readily accessible to the operator allowing the operator to select a desired attitude for the blade 21. The control console 80 includes an on-off switch 83, a left-right cylinder selection switch 84, right and left valve flow readback meters 85, a depth-of-cut potentiometer 86, means for supplying an input reference command such as potentiometer 87, and a slope indicator 88. It should be apparent as hereinafter described that only one of the meters 85 is essential to the operation of the attitude control system. The presence of the second meter 85 provides information relative to the functional characteristics of the system controlling the blade 21 in elevation.

The angular position sensing assembly 81 consists of a dust proof receptacle 91 which is adapted to be carried by the one part controlled in attitude, which in this embodiment is the assembly of the blade 21 and the ring gear 24. Receptacle 91 is provided with suitable electrical outlet fittings 92. A linear accelerometer 93 is mounted within the receptacle 91 in such a manner that its sensitive axis is perpendicular to the axis of tilt of the blade 21 about which cross-grade or slope is generated. An angular accelerometer 94 is also mounted within the receptacle 91 so that its sensitive axis is parallel to the axis of tilt of the blade 21.

The linear accelerometer 93 can be of any suitable type such as that disclosed in U.S. Pat. No. 3,331,253. The angular accelerometer 94 can also be of any suitable type such as that disclosed in U.S. Pat. No. 3,520,196.

Also mounted within the dust proof receptacle 91 or in electrical connection therewith through the outlet fittings 92 in an angular accelerometer bias error susceptibility reduction network 95, a phase lead network 96, and means for combining the output from a linear accelerometer 93 with the output from the angular accelerometer 94 such as the circuit 97. The bias error reduction network 95 includes an operational amplifier 100 which is connected as a positive follower thereby not inverting the input signal. A feedback capacitor 101 is connected between the output and the negative input terminal of the operational amplifier 100. A resistor 102 is connected between the same negative terminal and ground.

The non-inverted output of the operational amplifier 100 is connected to the input of the phase lead network 96. The phase lead network 96 consists of a capacitor 104 in parallel with a resistor 105 with the parallel combination in series with a resistor 106. The output of the phase lead network is connected to a first summing junction within the means for combining the linear and angular accelerometer outputs 97.

The circuit 97 consists of an operational amplifier 108, a circuit 109 connected to the first summing junction 107 with two series resistors 110 and a capacitor 111 from the junction of the two resistors 110 to ground. A circuit 114 forms a feedback loop around the amplifier 108 having two series capacitors 115 with a resistor 116 from the junction of the two capacitors 115 to ground.

The attitude control system for cross-grade or slope of the blade 21 includes a servo amplifier 117 and a proportional hydraulic valve 118 both mounted on the framework 12. They are included within the attitude control system in conjunction with the left actuator 47 when the left-right cylinder selection switch 84 is in the left position on the system control console 80.

The error correction sensing means 82 includes a sine potentiometer 119, a cosine potentiometer 120, and means for sensing linear acceleration in the direction of travel of the framework 12. The sine potentiometer 119 and the cosine potentiometer 120 are stacked and mounted on the top of a hydraulic gland 121, which is in turn mounted on the center of rotation of the ring gear 24. The two potentiometers 119 and 120 are mounted so that the relative movement between the potentiometer shaft and case is the same as that between the draw bar 39 and the ring gear 24.

In this embodiment the linear acceleration sensing means consists of a tachometer 125 and a differentiating circuit 126. The tachometer 125 is mounted on the framework 12. It is driven by suitable means such as the belt 127. Belt 127 is driven by a pulley 128 mounted on a shaft 129 extending out of the transmission housing 130. The shaft 129 is driven at a speed proportional to the speed of rotation of the rear wheels 16. Thus, the tachometer 125 supplies information as to the speed of rotation of the rear wheels 16 to the differentiating circuit 126. The differentiating circuit 126 is contained within or is electrically connected to the dust proof receptacle 91.

The system control console 80, the position sensing assembly 81, and the error sensing means 82 are connected electrically as shown schematically in FIG. 8.

Figure 7:
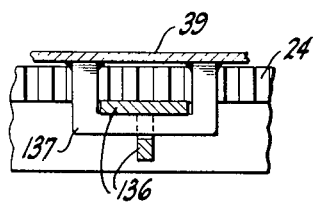
FIG. 7 is a cross sectional view taken along the line 7—7 of FIG. 6.
Figure 6:
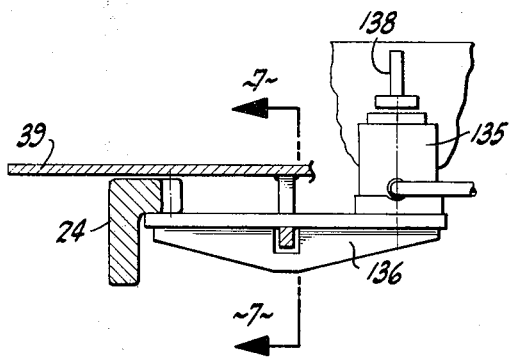
FIG. 6 is a cross sectional view taken along the line of 6—6 of FIG. 3.
Figure 4:
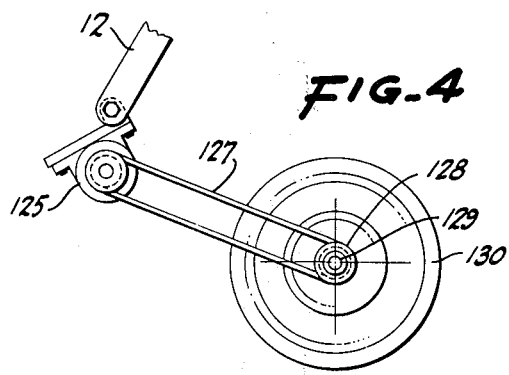
FIG. 4 is a cross sectional view taken along the line of 4—4 of FIG. 1.

Means is provided for locking the ring gear 24 to the rear extremity of the draw bar 39 for a purpose hereinafter described. Such means is comprised of jacks 135 mounted on the rear portion of the draw bar 39 as is best illustrated in FIGS. 6 and 7. The jacks 135 are supported on a lever 136 which in turn is supported by a fulcrum member 137. Lands 138 are also carried on the rear portion of the draw bar 39 to resist extension of the jacks 135.

Operation and use of the control system and apparatus incorporating the present invention with the motor grader 11 in performing the present method may now be briefly described as follows. Let it be assumed that the motor grader 11 is being utilized for grading the surface 13 on a road bed to conform in accordance with a predetermined cross-grade angle. Further let it be assumed that the wand 65 is carried in the mounting member 66 and is in contact with the external elevation reference wire 64 which serves as the means for providing the elevation reference. Also let it be assumed that the operator has set the controls on the system control console 80 located in the driving station 18. For the purposes of the description of this embodiment, the right side hydraulic actuator 46 is utilized as that controlled in elevation and pin 48 serves as the pivot point for the attitude control system and apparatus.

Assume the motor grader 11 is at rest on the rod bed 13. The operator actuates the attitude control system initially by selecting the "on" position on the on-off control switch 83 located on the system control console 80. Next the operator selects the "left" position at the left-right auto control switch 84. The last named switch selection places the left side actuator 47 in the cross-grade control system by virtue of selecting the related servo amplifier 117 and proportional hydraulic 118 to receive the signals generated by the operator's selection at the input reference comm- and potentiometer 87. The desired cross grade angle, which may be termed slope or tilt, is selected by actuation of the input reference command potentiometer 87. The cross grade angle is generated about an axis which extends parallel to the longitudinal axis of the road grader 11 and is defined as the tilt axis. The selected cross grade angle appears at the slope indicator 88 as the control switch system responds. The operator then observes the left valve flow read back meter 85 for a normal zero flow indication after the slope indicator 88 shows that the blade 21 has reached its selected cross-grade angle.

The operator then positions his control lever 68 to cause the blade 21 and the blade cutting edge 22 to move through some angle away from the perpendicular to the direction of travel. The jacks 135 are then extended by the operator forming rigid members between the lands 138 and the levers 136, thus locking the ring gear 24 and the blade 21 against the rear portion of the draw bar 39, thereby eliminating any rocking action of the ring gear 24 relative to the draw bar 39 and consequent cross-grade angle error.

The cross-grade angle is corrected for blade angle, designated by $O_B$ in FIG. 3, by the secant correction derived from the cosine potentiometer 120. Without tilt adjustment the cross-grade angle increases by virtue of introduction of the blade angle and the correction is utilized to re-establish the selected cross-grade angle in the manner and for the purposes hereinafter described.

Next the elevation reference potentiometer support member 66 is adjusted mechanically in elevation to obtain a null output from the elevation reference potentiometer 67 when the wand 65 rests on the elevation reference wire 64, and is locked in position. The sequence of adjustment for tilt, blade angle, and elevation is not critical since each adjustment is independent from the others. Having set the elevation reference and selected the cross-grade angle, or tilt, and blade angle to keep the blade 21 clear of cut material, the blade 21 assumes a steady state position. Without further control system input changes or some external stimulus the blade 21 will not move from its selected position.

As the motor grader 11 begins to travel down the surface 13, the front wheels 14 may roll over uneven surfaces such as small hills and valleys in the unfinished road bed ahead of the motor grader 11. Rising movement imparted to the front end of the framework 12 causes the elevation reference potentiometer 67 to transmit a signal to the summing junction 71 for the signal of the elevation command potentiometer 63, in turn causing an error signal to be generated because the two signals no longer match. The error signal is transmitted to the servo amplifier 72 and there it is transformed into a usable magnitude. The amplified error signal is further transmitted to the proportional hydraulic valve 73 where it causes an actuation of the valve 73 in accordance with the magnitude of the signal. The valve 73 allows a flow of hydraulic fluid proportional to said signal magnitude. This hydraulic flow is in turn directed to the hydraulic actuator 46 which extends, in this instance, in response to the flow and moves the draw bar 39 in elevation. The elevation reference potentiometer 67 attached by member 66 to the draw bar 39 is actuated through the wand 65 which is in contact with the external elevation reference wire 64. Thus, the signal from the elevation reference potentiometer 67 is brought back to a condition where it matches the signal generated by the elevation reference command potentiometer 63.

It can be seen that with the change in blade 21 elevation by virtue of an extension of the hydraulic actuator 46, the cross-grade angle will be changed also if the hydraulic actuator 47 is not extended to compensate for such change. The position sensing assembly 81 mounted on the blade 21 senses the change in cross-grade angle in the following manner. The angular acceleration of the blade 21 induced by the change in position at the elevation-controlled end of the blade 21, is detected by the angular accelerometer 94 and the signal so generated is transmitted to the combining network 97 for linear and angular accelerometer outputs. Double integration of the angular acceleration signal takes place and an output is produced which is proportional to the change in the angle of the blade 21.

Let it be assumed for the moment that the initial output conditions of the linear accelerometer 93 and the angular accelerometer 94 are zero. In such a case the output of the combining network 97 is fed back to a second summing junction 139 through a resistor 140 which junction also receives the output from the linear accelerometer 93 through a resistor 141. The two outputs in such a case would be equal and opposite, would cancel each other, and the error signal transmitted to the null bias reduction network 95 would be zero.

In the event that there would be some null offset in the angular accelerometer 94 causing drift in the output of the combining network 97, the signal fed back to the second summing junction 139, when compared with the output from the linear accelerometer 93, would produce an error signal by virtue of that comparison, which would in turn be transmitted to the input of the null bias reduction network 95. Assuming no change in tilt angle, the linear accelerometer 93 provides a steady state indication of the departure of its sensing axis from the local horizontal reference plane. In this instance the change in input to circuit 95 would all be due to angular accelerometer null offset causing integrator drift. Since null offset is inverted in sign by the operational amplifier 108, but is not inverted by the positive follower 100, the amplified input would produce a signal to the first summing junction 107 which would reduce the error by the gain of the amplifier 100.

The feedback circuit for amplifier 100 containing capacitor 101 and resistor 102 can be seen to be a short circuit at high frequencies and an open circuit at zero frequency. The circuit 95 does not therefore "wash out" the desired high frequency outputs from the angular accelerometer 94, but only steady state outputs such as would be provided by null offset. Thus, the circuit 95 renders the system no longer suceptible to a null offset or bias in the angular accelerometer 94. The compound amplifier made up of circuits 95 and 97 in combination will now amplify the output of the linear accelerometer 93 precisely by the ratio of the feedback resistor 140 to the input resistor 141. Another output from the circuit 97 is also used to close the loop around the blade 21, but it is modified by the secant of the blade angle as hereinafter described.

It is necessary as the blade 21 rotates about the axis of rotation of the ring gear 24 to build in a compensation circuit which produces a secant function of the angle of rotation so that as the blade is rotated about this axis, it continues to automatically cut the commanded cross-grade angle. The cross-grade angle being cut changes in accordance with the secant of the blade angle $\theta_R$ as it rotates about the ring gear 24 axis of rotation. This can best be illustrated by visualizing a 16 foot blade 21 centered laterally with the framework 12. With the blade 21 perpendicular to the direction of travel of the motor grader 11 along the surface 13, a cross grade may be selected which might lower the right end of the blade 21 some finite distance, for example, 6 inches. As the blade is rotated through some angle about the axis of rotation of the ring gear 24, for example 45°, now instead of being lowered 6 inches in the distance of 8 feet, the right end of the blade 21 would actually be 6 inches down in the distance of only about 70 percent of 8 feet. The blade 21 would actually be cutting a steeper cross grade than it was selected to cut in its initial position prior to rotation.

To provide this compensation, means is provided in the feedback path 114 around the operational amplifier 108 in the combining network 97 to generate a function proportional to the cosine of the angle of rotation of the blade 21 about the axis of rotation of the ring gear 24. This means consists of the rotary cosine potentiometer 120. Placement in the feedback path 114 around the operational amplifier 108 provides an inverse function at the output of the amplifier 108. The inverse function of the cosine is, by definition, the secant function and the signal so generated at the output of the combining network 97 is delivered simultaneously to the slope indicator 88 on the system control console 80 for visual readout, and also to a summing junction 144 for the input reference command from potentiometer 87 as seen in FIG. 8. The error generated through comparison of these two signals is connected to suitable power generation means such as a servo amplifier 117. The error signal as amplified is delivered to the proportional hydraulic valve 118 causing the valve to allow a hydraulic flow proportional to the electrical signal received. This flow is directed to the hydraulic actuator 47 causing it, in this instance, to extend. The blade 21 cross-grade angle is thus changed as it pivots about pin 48. The position sensing assembly 81 senses the change in the manner heretofore described, and the output of the combining network 97 is brought back to a level which matches the output of the input reference command potentiometer 87 at the summing junction 144.

Now let it be assumed that the motor grader 11, as it travels along a surface 13, experiences a tilting motion due to the contours of the surface 13 which raises the left side of the motor grader 11. The position sensing assembly 81 immediately sense the tilting motion as a change in cross-grade angle of the blade 21. The initial indication of the blade 21 tilting motion is provided as a result of the double-integrated output of an angular accelerometer 94 as described above. This output signal from the combining network 97 is delivered as before to both the slope indicator 88 and the summing junction 144 for the signal from the input reference command potentiometer 87. The error thus generated by comparison of the two signals is adapted as described above to cause the hydraulic actuator 47 to extend, and the blade 21 to pivot about pin 48 to a point where the position sensing assembly 81 produces an output which will produce zero error signal when compared with the output from the input reference command potentiometer 87, thus returning blade 12 to the precise slope to which the blade 21 was set by potentiometer 87.

As the motor grader 11 travels along a surface 13, the framework 12 begins to experience lateral and vertical vibrations as the velocity of travel increases. The linear accelerometer 93, being a relatively high frequency response instrument, senses these linear motions and produces an output which is delivered through resistor 141 to the summing junction 139. The double integral of the output from the angular accelerometer 94 is delivered through resistor 140 to junction 139 also. An error signal is generated through a comparison of the two signals and is transmitted to the input of the bias reduction network 95. The phase lead network 96 provides for control loop stability for feedback through resistor 140 by arresting phase lag which would cause oscillation, according to basic servo control theory which teaches that sustained oscillation will occur at a gain as high as one and phase lag of 180°.

The combining network 97 performs a low pass filtering function for the output from the linear accelerometer 93 when it responds to high frequency linear stimuli. Frequencies below 0.3 Hz are allowed to pass, and attenuation of the linear accelerometer output is in the order of 30 to 1 at a frequency of approximately 2.0 Hz. Thus the resonant frequencies of lateral and vertical motion of the framework 12 on the rubber tires 16 and 14 are blocked by the filtering afforded by the network 97 since these frequencies are generally in the range of 2 Hz or higher. The motor grader 11 can thus be driven at speeds where these vibrations occur without degradation of blade 21 control beause the position sensing assembly 81 is rendered insensitive to them by the filtering effect of the combining network 97.

As the motor grader 11 speeds up or slows down as it travels on the surface 13 the change in velocity gives rise to errors produced when the linear accelerometer 93 senses these changes due to a partial coupling to its sensitive axis with the motor grader 11 direction of travel as the blade 21 rotates about the axis of rotation of the ring gear 24 upon which it is mounted. The signals that are necessary to compensate for such direction-of-travel acceleration sensitivity must be modified by the sine of the blade 21 angle in deviation from the perpendicular to the direction of travel of the motor grader 11. The error-correction sensing means 82 provides this modified signal. Included for this purpose are a tachometer 125 which is driven by the shaft 129 extending from the transmission housing 130. The belt 127 driven by the shaft 129 rotates the tachometer shaft by means of the pulley 128 in such a fashion as to provide an output signal from the tachometer 125 which is proportional to the speed of the rear driving wheels 16 as heretofore described. This signal is connected to a differentiating circuit 126 which provides a signal proportional to the acceleration of the four rear driving wheels 16. The sine potentiometer 119 selects that portion of acceleration imparted to the motor grader 11 along the direction of travel which is proportional to the sine of the angle of the blade 21, and transmits it to the summing point 139 for the output from the linear accelerometer 93 and the combining network 97. In this fashion that portion of the output signal from the linear accelerometer 93 which is due to motor grader 11 direction-of-travel acceleration is cancelled.

The attitude control system apparatus, and method as applied to the control of a blade 21 mounted on a motor grader 11 can be seen to provide an accurate predetermined cross-grade angle in spite of the presence of various types of external stimuli. A change in tilt of the framework 12 is immediately sensed and compensated by the system. An externally induced change in elevation of the blade 21, causing a subsequent correction in blade 21 elevation by the elevation servo control, is followed closely by the cross-grade angle control due to the fast response made available by the double-integrated output of the angular accelerometer 94. Linear acceleration along the direction of motor grader 11 travel which would induce error in the attitude control system for the blade 21 is effectively sensed and transmitted by the error correction sensing means 82 for cancellation at the output of the linear accelerometer 93. The cross-grade angle, once selected at the input reference command potentiometer 87, is maintained at any blade angle about the axis of rotation of the ring gear 24 by insertion of the secant correction derived from the cosine potentiometer 116.

In connection with the foregoing embodiment of the invention it has been found that on occasion there may be slippage of the rear drive wheels 16 of the motor grader 11. When this occurs, the forward acceleration as calculated from the tachometer signal differs from the actual forward acceleration and the error correction sensing means 82 provides a signal for compensation that is not being generated in the linear accelerometer 93. This causes the blade 21 to move to a new angle erroneously, which could in turn cause the blade 21 to dig into the ground, causing the wheels 16 to slip even more and the blade 21 to dive yet deeper into the ground. To overcome this problem it has been found that a linear accelerometer 145 may be substituted for the tachometer 125 and differentiating circuit 126 and may be mounted on the framework 12 as shown in FIG. 1. The linear accelerometer 145 would be connected in the manner shown by dashed lines in the error correction sensing means 82 as shown in FIG. 8.

With the frame-mounted accelerometer 145 installed, the problem of positive feedback from rear wheel 16 slippage is eliminated. The sensitive axis of the accelerometer 145 is aligned with the direction of travel of the motor grader 11 over the surface 13. Only signals proportional to actual framework acceleration in this direction are generated by the accelerometer 145. Such signals are in turn delivered to the sine potentiometer 119 to select only that portion of the acceleration signals which is proportional to the sine of the angle between a vertical plane parallel to the direction of travel and the tilt axis of the blade 21. This part of the linear acceleration signal is then delivered to the summing junction 139 for the signal from the linear accelerometer 93 and the combining network 97. It serves to cancel out that portion of the acceleration along the direction of travel which was sensed by the linear accelerometer 93.

In the event that a correction is necessary to compensate for front wheel 14 elevation due to the presence of considerable uncut material ahead of the blade 21, the output of the linear accelerometer 145 may be biased with a voltage from the depth-of-cut potentiometer 86 situated on the system control console 80. This allows the operator to manually compensate for the depth of uncut material underneath the front wheel 14 which is usually less than one inch and much smaller for a finish cut.

The use of the linear accelerometer 145 for longitudinal acceleration compensation of the framework 12 provides an additional benefit. As the road grader 11 moves forward along a road bed 13 the framework 12 will experience pitch in accordance with the grade of the road bed 13. The blade-mounted linear accelerometer 93 senses some component of the gravity acceleration vector because of the pitch angle if either or both the blade angle and tilt angle are other than zero. The longitudinal accelerometer 145 also senses some component of gravity due to the pitch angle. This unwanted change in the output from the position sensing accelerometer 93 is then compensated by that portion of the output from the longitudinal accelerometer 145 as modified by the since potentiometer 119 to thereby null out the change. Thus, as the motor grader 11 begins to move from one road bed 13 grade to another, the blade 21 does not change its cross-grade angle despite the fact that the blade mounted linear accelerometer 93 produces a change in its output signal due to the change in gravity vector coupling.

Figure 12:
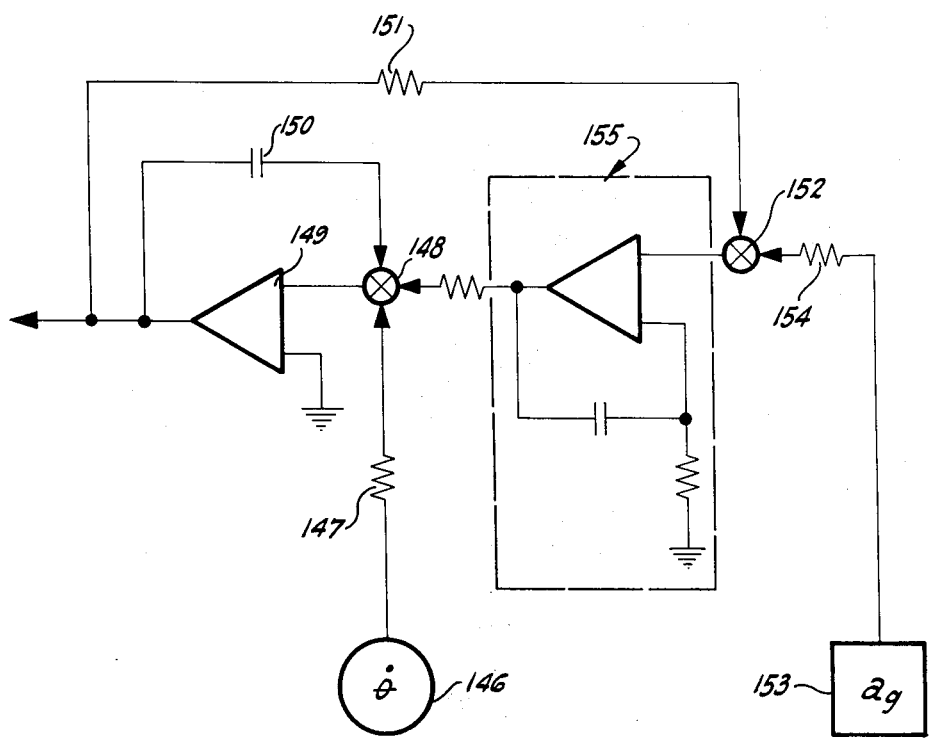
FIG. 12 is a circuit diagram partially in block form showing an alternate form of the control system, and apparatus incorporating the present invention.

As is best shown in FIG. 12, the sensor disclosed herein requires only an input from a transducer which is insensitive to linear motion and which can be mounted with the transducer which is sensitive to linear acceleration. As shown, an angular rate sensor 146 can be mounted on the part to be controlled in attitude with its sensitive axis parallel to the axis of tilt. The output from the rate sensor 146 is delivered through the resistor 147 to the summing junction 148. The angular rate-proportional output is then connected to the input of the operational amplifier 149. The rate input is integrated once due to the presence of the capacitor 150 in the feedback loop from the output of the operational amplifier 149 to the summing junction 148. Thus, a fast response signal proportional to angular position is presented at the output of the operational amplifier 149. A resistor 151 is provided in a feedback loop from the output of the amplifier 149 to a second summing junction 152. The output from the linear accelerometer 153 is also delivered to the summing junction 152 through a resistor 154. The error signal generated by comparison of the feedback signal and the linear accelerometer signal is then connected to the angular motion sensor bias susceptibility reduction network 155 which is schematically identical to the null offset error reduction circuit 95 as described before.

It should be noted in comparing FIG. 12 with FIG. 8 that the former requires no phase lead network, such as the circuit 96 in FIG. 8. The reason that such a circuit may be omitted without consequent degradation of the system operation lies in the fact that the single integration performed on the output of the angular rate sensor introduces only one time constant producing a 90° phase lag for angular rate inputs at a frequency corresponding to the characteristic time. It can also be seen that the circuitry existing between the second summing junction 152 and the output of the operational amplifier 149 comprises a "compound operational amplifier" and that a slow response output of the linear accelerometer 153 is provided which is amplified in a fixed ratio of the resistor 151 to the resistor 154. The operation of the system containing the angular rate sensor 146 would be similar to the operation of the system containing the angular acceleration sensor 94. The primary disadvantages which lies in the system utilizing the angular rate sensor 146 is the fact that the usually-used spinning wheel rate sensor is seriously limited in life as compared to the angular accelerometer 94.

Figure 10:
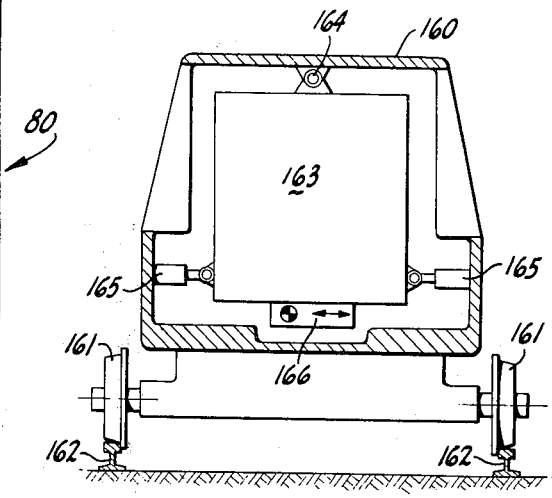
FIG. 10 is a cross sectional view of another embodiment of the present invention showing a railroad car of a type utilizing a control system and apparatus incorporating the present invention.

From the foregoing it should be apparent that other embodiments of the invention may be used with other moving machines such as a railroad car carrying a passenger compartment capable of being stabilized as shown in FIG. 10. As shown therein, a rectangular framework 160 is provided which is mounted on wheels 161 adapted to roll on tracks 162. A passenger compartment 163 is disposed within the framework 160. Means is provided for pivotally mounting the compartment 163 in the framework 160 at the point 164 to permit pivoted pendulous movement of the compartment about an axis which is disposed above the compartment 163 and extends longitudinally thereof. Actuator means such as the hydraulic actuators 165 are mounted between the lower extremities of the opposite sidewalls of the framework 160 and the passenger compartment 163. A high speed tilt sensor 166 is shown secured to the lower portion of the passenger compartment 163. The high speed tilt sensor 166 is comprised basically of the components shown in FIG. 12 or the circuit 98 in FIG. 8.

Figure 11:
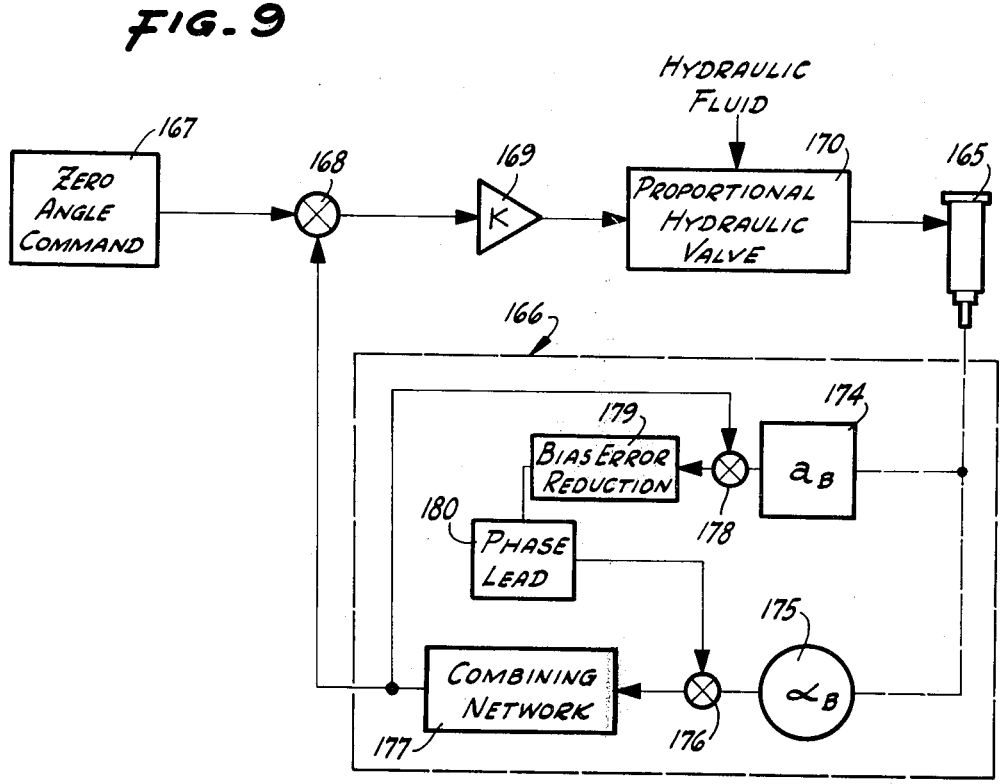
FIG. 11 is a block diagram of the control system for the embodiment of the invention in FIG. 10.

A block digram of an embodiment of the attitude control system which could be used for stabilization of the passenger compartment 163 in a railroad car frame 160 is illustrated in the block diagram shown in FIG. 11. A zero angle command potentiometer 167 supplies a reference or command output signal to a summing junction 168. The summing junction 168 is connected to a servo amplifier 169 which is in turn connected to transducer means for conversion of the electrical power to motivating force such as a proportional hydraulic valve 170. The vlave 170 permits hydraulic fluid flow proportional to the signal received from the servo amplifier 169. The hydraulic fluid is in turn directed to the hydraulic actuators 165.

The high speed tilt sensor 166 includes a linear accelerometer 174 and an angular motion sensor 175 such as an angular accelerometer or an angular rate sensor. For the purposes of this description it will be assumed that the angular motion sensor 175 is an angular accelerometer. The angular accelerometer 175 has its sensitive axis aligned parallel with the axis of tilt of the passenger compartment 163 which passes through the passenger car suspension pivot point 164. The linear accelerometer 174 has its sensitive axis aligned nominally horizontal and perpendicular to the axis of tilt just described. The output of the angular accelerometer 175 is delivered to a first summing point 176 at the input to the combining network 177. The angular acceleration signal is double integrated in the combining network 177 and presented at the output as a fast response angular position signal. This output signal from the combining network 177 is then directed to a second summing point 178 which also receives the output signal from the linear accelerometer 174. The error signal generated by comparison of the last named two signals is then delivered to the angular sensor bias error reduction network 179. The effect of null offset in the angular accelerometer 175 is effectively eliminated in the error reduction 179 and the signal is then delivered to a phase lead network 180 to induce stability as hereinbefore described. The phase corrected signal is then connected to the first summing junction 176 from which it is directed to the combining network 177 which has a low pass filtering effect on the signal generated by the linear accelerometer 174 as hereinbefore described. The output from the combining network 177 is also delivered to the summing junction 168 which received the signal from the zero-angle command potentiometer 167. Operation of the embodiment shown in FIG. 10 may be briefly described as follows.

Selection is made at the zero angle command potentiometer 167 for an angle which will be maintained between the floor of the passenger compartment 163 and the local horizontal plane. This signal is transmitted to the summing junction 168 and to the servo amplifier 169, which in turn provides a signal which actuates the proportional hydraulic valve 170. The proportional flow thus demanded of the valve 170 is directed to the hydraulic actuators 165 which in turn position the passenger compartment 163 to maintain the floor in the selected position. The position of the compartment 163 is sensed by the high speed tilt sensor 166 as heretofore described, and the angular position signal is delivered to the summing junction 168 for comparison with the signal from the zero-angle command potentiometer 167 and generation of error signal.

Let it be assumed that the railroad car frame 160 approaches a curve in the track 162. There is an acceleration of the passenger compartment 163 toward the center of the radius of curvature of the turn which is sensed by the high speed tilt sensor 166. The output thus generated by the tilt sensor 166 is delivered to the junction 168 with consequent generation of an error signal which is delivered to the servo amplifier 169. The remainder of the operation of the control system is as heretofore described, with the passenger compartment 163 being positioned by the hydraulic actuators 165 so as to change the output of the tilt sensor 166 to that selected at the zero angle command potentiometer 167.

It can be seen that this system may be used to align the passenger compartment 163 so that the floor of the compartment is maintained at any angle relative to the resultant of the acceleration of gravity and any accelerations in a horizontal plane due to a change in direction of travel of the railroad car frame 160 on the tracks 162. One such useful angle is 90° to the resultant acceleration, or zero degrees to the local horizontal reference plane.

The angular position sensor and control system, apparatus and method provides automatic control of the tilting or rotational movement of one member of a machine relative to a local horizontal reference plane. The local horizontal plane is defined as a plane perpendicular to the local long-term acceleration vector which includes the acceleration of gravity as a component. In particular the sensor and control system, apparatus and method can be seen to be adaptable for use on a motor grader in controlling the tilt angle of the blade carried thereon. The sensor embodied in this invention is insensitive to high frequency linear oscillations which may be induced in the machine. This allows relatively high speed operation of the machine. Instantaneous response of the controlled part in accordance with the reference selected by the control system is provided by the rotational sensitivity of the apparatus. The angular position sensor and control system and apparatus as utilized in the motor grader embodiment allows high speed operation, automatic correction of cross grade angle for rotation of the blade without a vertical axis, and means for avoiding misleading inputs to the system in the event of slippage of the drive wheels.

Referring to FIG. 13 a block diagram is shown for one embodiment of the angular position sensor which is used in the system embodiment of FIG. 8 above. As described heretofore in more detail a level sensor consisting of the linear accelerometer 93 produces a steady state or long term indication of angular deviation from the local horizontal which is connected to the summing point 139. An error signal is directed from the summing point 139 to the bias reduction network 95 which in turn is connected to the phase lead network 96 for the reasons expressed above. The phase lead network is connected to the summing point 107 which also receives the output from angular accelerometer 94. The error signal or difference between the two inputs to summing point 107 is delivered to the combining network 97 which produces an output voltage indicative of angular position referenced to local horizontal. The output signal may be seen to be directed back to summing point 139 for comparison with the steady state output from linear accelerometer 93 whereby long term angular accelerometer output such as null offset may be "washed out" by the bias reduction network 95 as explained above. FIG. 13 also shows the output from the combining network 97 directed by dashed lines to a coordinate transformation circuit 200. An additional linear accelerometer 201 having a sensitive axis aligned with the nominally vertical axis of a structural body is shown with an output also directed to coordinate transformation circuit 200. Coordinate transformation circuit 200 has the capability of computing displacement from the output signal of additional linear accelerometer 201 and transforming it to a displacement perpendicular to the local horizontal plane for providing the vertical displacement h. It may be seen that in like manner, tilt signals about two mutually perpendicular axes in a structural body plane which is nominally horizontal may also be directed to the coordinate transformation circuit 200 to provide body tilt information about two perpendicular axes in the local horizontal plane. Devices for providing such tilt signals are not shown, but could be similar to linear accelerometer 201.

Figure 19:
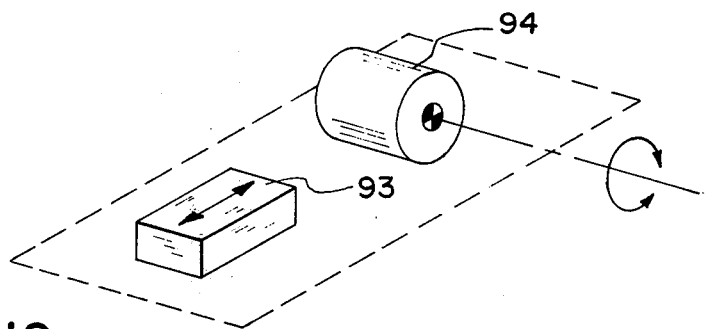
FIG. 19 is an isometric view of an angular position sensor containing an angular accelerometer and a linear accelerometer showing the relative orientation of their sensitive axes.

The angular position sensor configuration of FIG. 13 provides a means for determining angular orientation of the structural body about a given axis with reference to earth's coordinates without using the usual gyroscopic inertial reference corrected for earth's motion in space. The angular position sensor transducers 93 and 94 may be hard mounted to the framework of a structural body for determining angular deviation of the body about a specified axis as shown in FIG. 19. Level sensor 93 and angular motion detector 94 are mounted with their respective sensitive axes oriented as shown therein. The level sensor or accelerometer 93 is relied upon for only very low frequency information and all of the higher frequency angular displacement information is supplied by double integration of the output of the angular accelerometer 94. Two sets of the sensors shown in FIG. 19 connected as in FIG. 13 may be used to replace a vertical gyro. The two sets of angular position sensors of FIG. 19 in such a case are aligned with sensitive axes mutually perpendicular to sense angular position about the roll and pitch axes of the structural body. The linear accelerometer 93 in each set of FIG. 19 generates spurious signals due to linear accelerations resulting from translational motions of the structural body upon which they are mounted. These spurious indications are transient in nature, and are blocked by the long time constant where such signals are received in the means for combining 97. Steady state or long term outputs from the angular accelerometer 94, on the other hand, are washed out by means of the feedback loop to the summing point 139 in FIG. 13. The feedback produces an error input to the wash out or bias reduction network 95 which produces an output to the summing junction 107 at the input to double integrator 97 cancelling steady state signals from the angular accelerometer 94 which arrive there. Therefore, long term information only is provided by the level sensor represented by linear accelerometer 93, and short term information only is provided by the means responsive solely to angular motion represented by angular accelerometer 94. FIGS. 15, 16 and 17 show the relative response characteristics of the long term and short term signals from the output of combining network 97. FIG. 15 represents the response characteristics of the level sensor at the output of combining network 97. FIG. 16 represents the response characteristics of the angular motion detector at the output of combining network 97. FIG. 17 represents the combination of the two response characteristics at the output of combining network 97. It may be seen that the upper roll-off for the level sensor is made to coincide with the lower roll-off for the angular position detector at a frequency designated $f_1$. A frequency designated $f_2$ represents a response roll-off frequency at the upper limit of the angular motion detector.

Figure 20:
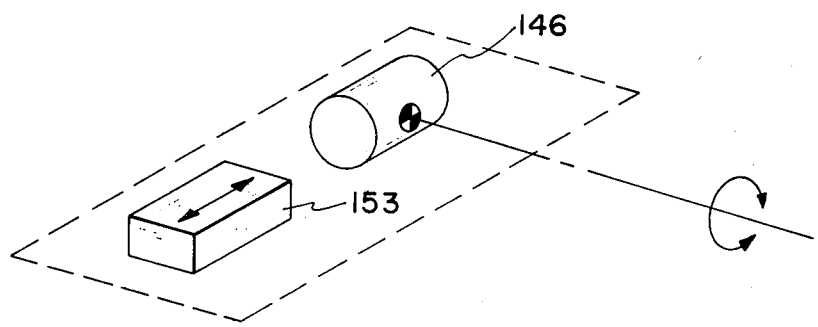
FIG. 20 is an isometric view of an angular position sensor containing an angular velocity sensor and a linear accelerometer showing the relative orientation of their sensitive axes.

Referring to FIG. 14 another embodiment of the angular position sensor is shown which is particularly adaptable to stable platform applications. In this embodiment an angular velocity sensor 146 as shown in FIG. 12 and a level sensor such as linear accelerometer 153 also shown in FIG. 12 are used. As in FIG. 13 the linear accelerometer 153 of FIG. 14 provides a steady state output indicative of deviation from the local horizontal. The angular velocity sensor 146 provides a signal which is made available as one angular rate sensor output and is also directed to a summing point 202. The output from the summing point 202 is directed to an integrator 203 which in turn provides an output related to angular position. The output related to angular position is also directed to a summing point 204 which also receives the output from the level sensor 153. An error signal may be generated from the summing point 204 directed to an auto null circuit 106. The output from the auto null circuit 206 is fed back to summing point 202. FIG. 20 shows the relative orientation of the sensitive axes of linear accelerometer 153 and angular velocity transducer 146 for the embodiment of FIG. 14. It should be noted that the previously mentioned disadvantages associated with a spinning rotor type angular rate sensor may be obviated by use of an angular rate sensor such as that described in U.S. Pat. No. 3,682,003.

Figure 21:
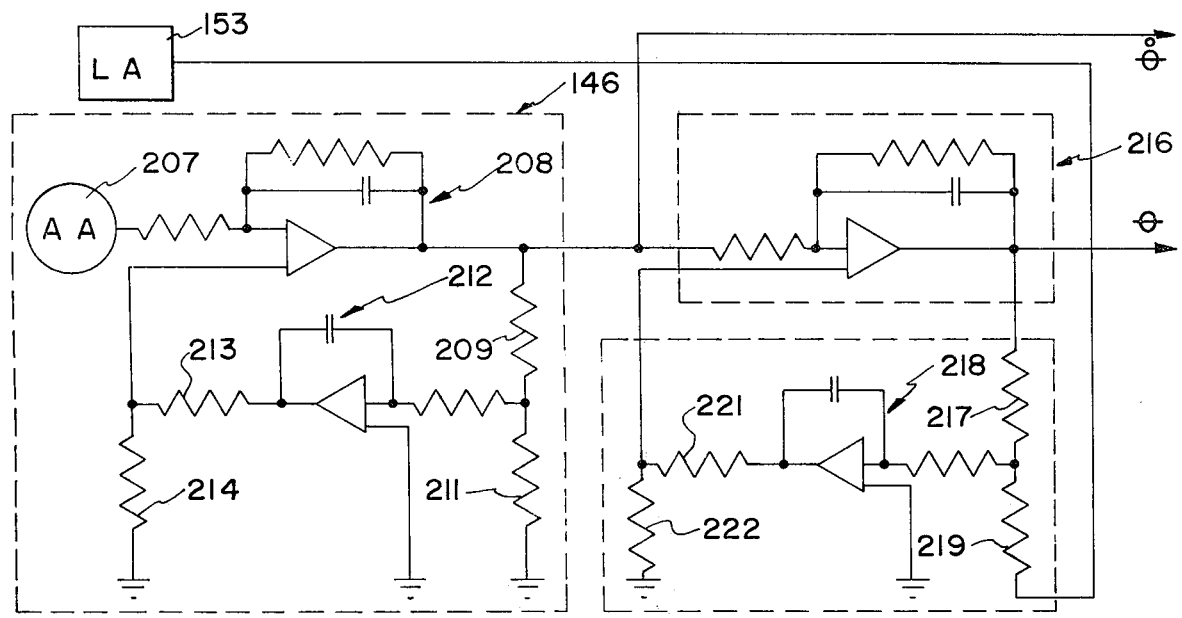
FIG. 21 is a circuit diagram of a network for receiving and combining signals from a linear accelerometer and an angular accelerometer for providing output related to angular position.

Referring to FIG. 21 a circuit diagram is shown for one configuration of the angular position sensor embodiment of FIG. 14. The level sensor is represented by linear accelerometer 153 and the angular velocity sensor is shown generally at 146. The angular velocity sensor 146 in this embodiment includes an angular accelerometer 207 which may be similar to that at 94 and which produces an output which is delivered to an integrator 208 which provides an output which rolls off below a low corner frequency. This low roll-off limit is required to eliminate drift at the output of integrator 208 due to null offset in angular accelerometer 207. Null offset is compensated by the feedback loop containing the attenuating network represented by resistors 209 and 211 at the input to the long time constant integrator shown generally at 212, and the attenuating network represented by resistors 213 and 214 at the output of integrator 212. Any long term outputs from signal integrator 208 are washed out because the feedback loop including automatic nulling integrator 212 feeds such long term signals back to the input of signal integrator 208 which cancels steady state output from accelerometer 207. This prevents any DC response from occurring at the output from the angular velocity sensor 146.

The output from angular velocity sensor 146 is directd to a subsequent signal integrator 216 for producing an output related to angular deviation. The output from signal integrator 216 is also directed through a resistor 217 to the input of an additional auto nulling integrator 218 having a long time constant through proper selection of its input resistor and feedback capacitor. The output from linear accelerometer 153 is also delivered to the input of additional automatic nulling integrator 218 through resistor 219. A further attenuating circuit consisting of resistors 221 and 222 at the output of additional automatic null integrator 218 is provided for further increasing the time constant of the feedback loop around subsequent signal integrator 216 through additional automatic null integrator 218.

The function of the angular position sensor shown schematically in FIG. 21 may now be described. As stated above, the output of angular velocity sensor 146 has no DC response and provides angular velocity information beginning at some low corner frequency such as $f_1$ in FIG. 16. The subsequent signal integrator 216 provides an angular position output having the same response characteristics. The DC or long term angular position information is derived from the lever sensor represented by linear accelerometer 153 which provides one input to the automatic nulling integrator 218. Another input to the automatic nulling integratoir 218 is attenuated output from signal integrator 216. The long time constant input imposed on automatic null integrator 218 together with the attenuation provided by resistors 221 and 222 delay the error correction feedback to the input of signal integrator 216 so that high frequency angular velocity inputs may appear at the output of integrator 216 for instantaneous indication of angular deviation. Thus, short term angular deviations are provided by the angular velocity sensor 146 and steady state or long term angular deviations are provided by the linear accelerometer 153.

Figure 23:
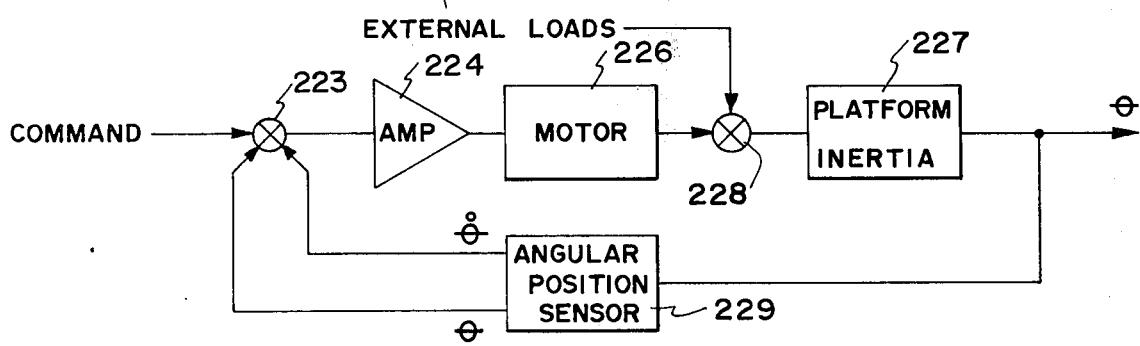
FIG. 23 is a block diagram of an antenna platform stabilization system showing the angular position sensor in the feedback loop.

To stabilize a platform, the outputs related to angle and to angular velocity from the angular position sensor as shown in FIG. 21 are generally directed to a summing point 223 as shown in FIG. 23. FIG. 23 shows a block diagram of a platform control system having a command signal which is also directed to summing point 223. An error signal from summing point 223 is connected to the input of an amplifier 224 which provides power for driving a platform positioning motor 226. Positioning motor 226, in a practical application, must not only drive platform inertia 227, but must also deal with external loads such as wind loads. Summing point 228 receives the energy from both external platform loads and the motor 226. In this manner the platform 227 is driven to a predetermined angle. The angular position of the platform 227 is directed to angular position sensor 229, which may be of the type shown in FIG. 14 above. FIG. 14 may be seen to produce signals related to angular velocity and to angular position. These two latter signals are directed to summing point 223 for providing error signals for damping platform motion and for an input to power amplifier 224.

Figure 18:
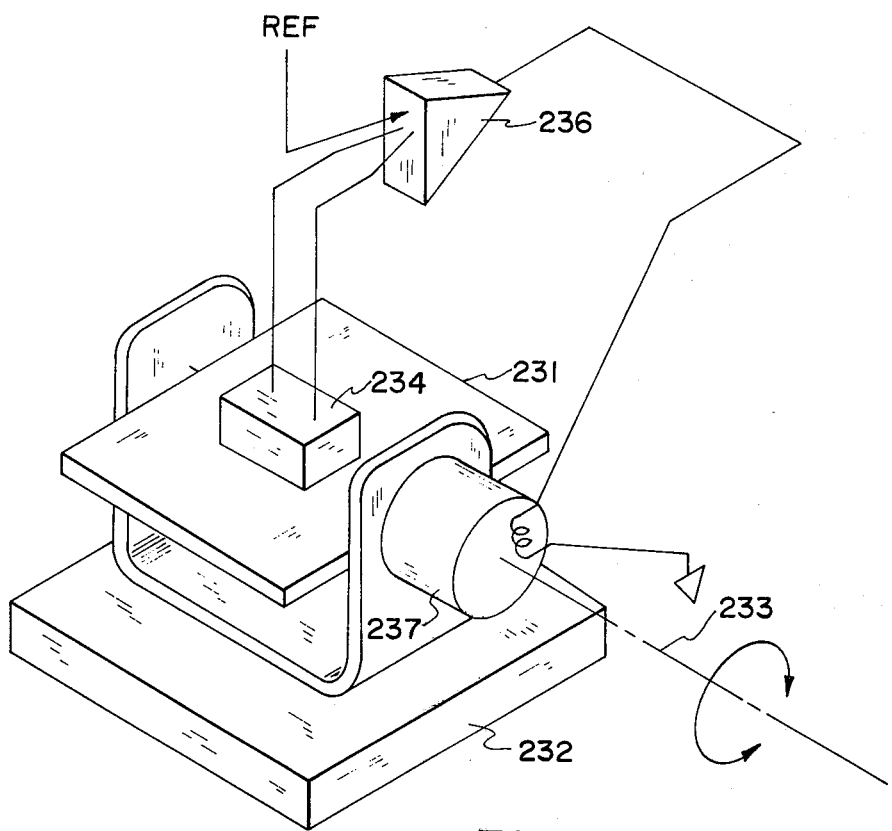
FIG. 18 is an isometric view of a single axis platform having a platform-mounted angular position sensor.

Referring to FIG. 18 a single axis platform is shown which may utilize any of the angular position sensor embodiments described above including those shown in FIGS. 13 and 14. A platform 231 mounted within a structural body 232 is capable of rotation about an axis 233. An angular position sensor 234 is mounted on the platform 231 and is connected to a power amplifier 236 which in turn is connected to a torque motor 237 which is mounted on the structural body 232 to provide a torque vector colinear with the axis 233. A reference signal may also be introduced into amplifier 236 which may be related to a predetermined angle to be assumed by platform 231.

Figure 22:
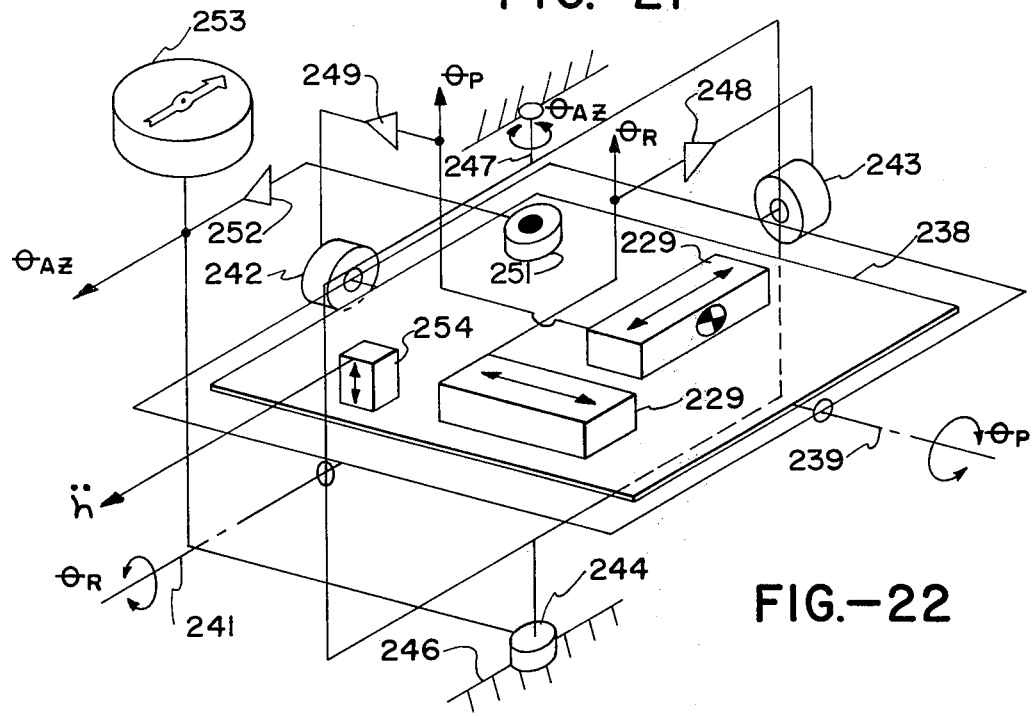
FIG. 22 is an isometric view of a three axis stable platform.

Referring to FIG. 22 a three axis stable platform 238 is shown having axes 239 and 241 mutually orthogonal and in a local horizontal plane. In this embodiment axis 239 is designated the pitch axis and axis 241 is designated the roll axis. Torque motors 242 and 243 are situated to produce torque vectors colinear with the pitch and roll axes respectively. An azimuth pickoff 244 is mounted between the framework 246 of the structural body and a yaw or azimuth axis 247. A first angular position sensor 229 is shown mounted on platform 238 in a position to sense the angular position relative to earth's coordinates about the roll axis. A power amplifier 248 is shown to receive the output from the first angular position sensor 229 having an output connected to the roll axis torque motor 243. A second angular position sensor 229 is shown having its sensitive axis aligned to detect angular position relative to earth's coordinates about the pitch axis 239. The output of the second angular position sensor 229 is connected to a power amplifier 249 having an output connected to the pitch axis torque motor 242.

The stable platform 238 may have mounted thereupon an angular accelerometer 251 having its sensitive axis aligned with the local vertical. The output of angular accelerometer 251 is directed to a double integrating circuit 252 which in turn has an output connected to a summing point which also receives output from an inertial azimuth sensor 253. The last named summing point also receives output from the azimuth gimbal pickoff 244.

Stable platform 238 also may have mounted thereon a linear accelerometer 254 having a sensitive axis aligned with the local vertical. The output from the linear accelerometer 254 may be directed to a circuit for computing vertical displacement from the vertical acceleration $\ddot{h}$ of the structural body framework 246.

The mode of operation of the three axis platform shown in FIG. 22 may be described as follows. Angular deviation of the structural body framework 246 about the roll axis 241 produces an output from the first angular position sensor 229 which provides input to power amplifier 248 driving torque motor 243 to position platform 238 so as to remove the signal generated by first angular position sensor 229. In like manner, pitch motion of the structural body framework 246 generates a signal in second angular position sensor 229 which is transmitted to pitch axis power amplifier 249 for driving pitch axis torque motor 242 to reposition platform 238 to diminish the signal from second angular position sensor 229. Yaw motion of the structural body framework 246 about yaw axis 247 causes an output from angular accelerometer 251 which is directed to double integrator 252 for providing short term yaw information. The output from inertial azimuth sensor 253 and azimuth pickoff 244 are combined to provide a signal related to the azimuth of platform 238 referenced to inertial space. The combined outputs of inertial azimuth sensor 253 and azimuth pickoff 244 are then summed with the output from double integrator 252 for providing an azimuth indication referenced to earth's coordinates. An angular position sensor and control system and method has been disclosed herein utilizing a level sensor and an angular position detector. The level sensor is used to detect long term angular position, and the angular position detector is used to provide short term information. A combining network is used for receiving level sensor and angular position detector outputs and for cutting off the level sensor output at a low corner frequency, such as 0.001 Hz and providing an automatic nulling feature for washing out all signals from the angular position detector below the low corner frequency, such as 0.001 Hz. The combining network output provides a broad band signal from DC to the upper limit of the angular position detector for monitoring angular position of a structural body relative to earth's coordinates. Vertical displacement as well as yaw displacement of the structural body may be derived by placement of proper sensors on a platform stabilized by the angular position sensors or coordinate transformation of strap down sensors. The mechanical life problems associated with spinning rotor type gyroscopes are eliminated while providing commensurate accuracy in both strap down and stable platform applications.

We claim:

1. In an angular position sensor and attitude control system for controlling the tilting movement relative to a local horizontal reference of one part of a machine having a framework when the framework of the machine shifts its position relative to the reference as the machine moves relative to a surface, means carried on the machine for supplying an input reference command for control of movement of said one part, means mounted on the machine for receiving the input command, sensing means carried by said one part to sense the tilting movement of said part, said sensing means including a linear accelerometer having its sensitive axis at right angles to the axis of the tilting movement and an angular accelerometer with its sensitive axis parallel to the axis for tilting movement, means mounted on the machine for combining the outputs from the linear and angular accelerometers and comparing the combined outputs with the input command at said means for receiving the input command to supply an error signal therefrom, means mounted on the machine for receiving the error signal for and means carried on the framework driven by said mechanical force which causes tilting movement of said one part in accordance with the error signal.

2. A system as in claim 1 wherein said machine is of a type in which said one part is capable of being rotated about a vertical axis, together with means adapted to be mounted on the framework for detecting linear acceleration of the framework along the direction of movement of the machine and providing an acceleration output, a sine function means receiving said last-named acceleration output for modifying the magnitude of said last-named acceleration output in accordance with the sine of the angle between a vertical plane parallel to the direction of travel and the tilting axis and supplying the same to said sensing means so as to compensate for error induced in the sensing means carried by the one controlled part due to linear acceleration of the machine along the direction of movement of the machine when rotation of said one part aligns the sensitive axis of the linear accelerometer mounted thereon other than perpendicular to the direction of movement.

3. A system as in claim 2 wherein the sine function means is adapted to be mounted partly on said framework and partly on said one part for automatically sensing rotation of said one part relative to said framework.

4. A system as in claim 2 wherein said machine is of a type which includes surface-engaging means for shifting the position of the machine and power means including a rotating shaft for driving the surface-engaging means and wherein said means for detecting linear acceleration of the framework along the direction of travel of the framework on a surface comprises ground speed indicating means such as a tachometer adapted to be mounted on the framework and coupled to the shaft, and providing an output signal proportional to the driven speed of the surface engagine means, and means for differentiating the last-named output to provide a signal proportional to acceleration and for supplying the acceleration signal proportion to acceleration and for supplying the acceleration signal to the sensing means.

5. A system as in claim 2 wherein said means for detecting linear acceleration of the framework along the direction of movement of the framework of the machine is comprised of a linear accelerometer adapted to be mounted on the framework with its sensitive axis parallel to the direction of travel of the framework.

6. A system as in claim 1 wherein said means for combining the output from the linear and angular accelerometers comprises an operational amplifier having an input and an output, a first summing junction at the input, first circuit means coupling the output from the angular accelerometer to the first summing junction, said operational amplifier including second circuit means connected between the output and the first summing junction to form a feedback loop around the operational amplifier so that the output from the operational amplifier is a double integral of the angular accelerometer output, a second summing junction at the linear accelerometer output, third circuit means connected between the output of the operational amplifier and the second summing junction, fourth circuit means coupling the output of the linear accelerometer to the second summing junction and means connecting the second summing junction to the first summing junction whereby the output from the operational amplifier is also a low-pass filtered amplification of the linear accelerometer output.

7. A system as in claim 6 wherein each of said first and second circuits comprises a resistive-capacitive network and said third and fourth circuits are resistive.

8. A system as in claim 7 wherein said first circuit consists of two serially connected resistors and a capacitor connected from between the resistors to ground, and wherein said second circuit consists of two serially connected capacitors and a resistor connected from between the capacitors to ground.

9. A system as in claim 6 wherein said means coupling the second summing junction to the first summing junction includes an error nulling amplifier in the form of a positive follower for reducing the susceptability of the system to minute bias errors produced by the angular accelerometer, and a phase-lead network to prevent oscillation from positive feedback due to the combination of negative feedback and two ninety-degree phase shifts in the double integrator.

10. A system as in claim 9 wherein said error nulling amplifier receives its input at the positive input terminal and includes a capacitive feedback from the nulling amplifier output to the negative input terminal and a resistor placing the negative input terminal above ground, whereby the output polarity follows input polarity, and amplification varies from the gain of the amplifier at zero frequency to one at a circular frequency equivalent to the quantity 1/RC.

11. A system as in claim 1 wherein the machine is a motor grader and wherein said one part is an earth moving blade.

12. A system as in claim 1 wherein the machine is a ralroad car having a framework and wherein said one part is a passenger compartment pivotally supported from the framework to permit pivotal movement about an axis parallel to the direction of movement of the car.

13. A system as in claim 6 wherein said machine is of a type in which said one part is capable of being rotated about a vertical axis together with means providing a correction signal to the means for receiving the error signal adapted to cause tilting movement of said one part to thereby maintain the tilt resulting from the input reference command as projected onto a vertical plane perpendicular to the direction of movement of the machine along the surface.

14. A system as in claim 6 where said machine is of a type in which said one part is capable of being rotated about a vertical axis and wherein said second circuit means includes means for modifying the output of the operational amplifier with a secant function, whereby the change in tilt angle as projected onto a vertical plane perpendicular to the direction of movement of the machine along the surface is compensated.

15. A system as in claim 1 wherein said means for causing tilting movement comprises first and second actuators located on opposite sides of the axis for tilting movement of said one part, together with means for establishing an elevation reference adapted to control the operation of said second actuator, and wherein the means for receiving the error signal is adapted to control the operation of the first actuator.

16. In an angular position sensor and control system for controlling the tilting movement relative to a local horizontal reference of a blade of a road-grading apparatus of a type including a framework, utilizing an external elevation reference, having surface-engaging means carried by the framework for travelling on a surface to be graded, motive means for driving the surface-engaging means for advancing the framework over the surface, means for mounting the blade on the framework providing rotational movement of the blade about a vertical axis and tilting movement of the blade about a horizontal axis, actuating means including first and second actuators disposed between the blade and the framework on opposite sides of the horizontal axis for causing tilting movement of said blade, said control system comprising means carried by the blade for sensing the external elevation reference and providing an elevation reference signal, means for converting said elevation reference signal to a blade elevation force for urging the second actuator to an elevation determined by the external elevation reference, means mounted on the blade for sensing the angular position of the blade and providing a blade tilt signal, means for converting said blade tilt force, and means for coupling said blade tile force to said first actuator to thereby control the tilting motion of the blade to maintain a predetermined cross-grade angle regardless of lateral tilting movement of the framework as the apparatus moves over the surface, said means for sensing including linear accelerometer means carried by the blade with a sensitive axis perpendicular to the horizontal axis of tilting movement providing an output indicative of tilt of the blade about the horizontal axis relative to the local horizontal reference, and angular accelerometer means with a sensitive axis parallel to the horizontal axis of tilting movement of the blade providing an output indicative of angular acceleration of tilting movement about the horizontal axis.

17. A control system as in claim 16 wherein said means for sensing includes electronic circuitry for receiving the outputs from the linear and angular accelerometers providing a fast-response output which is the double integral of the angular accelerometer output and further providing a slow response amplified output of the linear accelerometer output, means for combining the fast and slow response outputs, means for providing an input reference command signal, and means for comparing the combined fast and slow response outputs with the input reference command signal for providing said blade tilt signal.

18. A control system as in claim 16 wherein said means for sensing includes means mounted on said framework for detecting linear acceleration of the framework along the direction of travel of the framework on said surface providing an additional acceleration output, means for modifying the additional acceleration output in accordance with the sine of the angle between a vertical plane parallel to the direction of travel and the tilting axis and for combining the modified additional acceleration output with output indicative of tilt to provide an error-connected acceleration output from the linear accelerometer means carried by the blade.

19. A control system as in claim 17 wherein said electronic circuitry providing a fast response output includes an operational amplifier and means for modifying the output of the operational amplifier in accordance with the secant of the angle between a vertical plane parallel to the direction of travel and the tilting axis.

20. In an angular position sensor and control system for controlling the tilting movement relative to a local horizontal reference of a blade of a road-grading apparatus of a type including a framework utilizing an external elevation reference, having surface-engaging means carried by the framework for travelling on a surface to be graded, motive means for driving the surface-engaging means for advancing the framework over the surface, means for mounting the blade on the framework including a drawbar and means for providing rotational movement of the blade about a vertical axis and tilting movement of the blade about a horizontal axis, actuating means mounted between the framework and the blade including first and second actuators disposed on opposite sides of the horizontal axis for causing tilting movement of said blade, said control system comprising means carried by the blade for sensing said external elevational reference and producing an elevation reference signal, means for converting said elevation reference signal to a first force, means for applying said first force to said second actuator thereby controlling operation of said second actuator, means mounted on the drawbar for sensing the angular position of the blade and providing a blade position signal, means for converting the blade position signal to a second force, and means for applying said second force to said first actuator for controlling the operation of said first actuator to thereby control the tilting motion of the blade to maintain a predetermined cross-grade angle regardless of lateral tilting movement of the framework as the apparatus moves over the surface, said means for sensing including linear accelerometer means with a sensitive axis perpendicular to the longitudinal tilt axis of the drawbar providing an output indicative of tilt of the blade about the horizontal axis relative to the local horizontal reference and angular accelerometer means with a sensitive axis parallel to the longitudinal tilt axis of the drawbar providing an output indicative of angular acceleration of tilting movement about the horizontal axis and means for combining said outputs indicative of tilt and angular acceleration for providing said blade position signal.

21. In a motor grading apparatus for use with an external elevation reference, a framework, surface engaging means carried by the framework and adapted to travel on a surface to be graded, motive means for driving the surface engaging means for advancing the framework over the surface, a surface-grading blade, means mounting the blade on the framework and permitting rotational movement of the blade about a vertical axis and tilting movement of the blade about a horizontal axis, means including first and second actuators disposed on opposite sides of the horizontal axis for causing tilting movement of said blade, means carried by the blade and adapted to sense said external elevation reference for controlling operation of said second actuator, means mounted on the blade for sensing the tilting movement of the blade as the apparatus moves over the surface, said last named means including a linear accelerometer carried by the blade with its sensitive axis perpendicular to the horizontal axis of tilting movement of the blade, an angular accelerometer carried by the blade with its sensitive axis parallel to the horizontal axis of tilting movement of the blade, and for combining the outputs of the linear and angular accelerometers providing a fast response double integrated output from the angular accelermoeter and a slow-response amplified output from the linear accelerometer, means mounted on the framework adapted to be controlled by the operator of the apparatus for supplying an input reference signal, means carried by the apparatus for receiving the combined outputs of the linear and angular accelerometers and comparing the combined outputs with the input reference signal, means for supplying an error signal resulting from the comparison, means mounted on the apparatus for receiving and converting the error signal to a mechanical force, and means for applying said mechanical force to said first actuator whereby a predetermined cross-grade angle is maintained on the surface grading blade regardless of lateral tilting movement of the framework during operation of the apparatus.

22. Apparatus as in claim 21 together with means mounted on the framework for measuring the acceleration of the framework in the direction of travel of the framework providing an additional acceleration output, means for modifying the additional acceleration output with the sine of the angle between a vertical plane parallel to the direction of travel and the tilting axis, means for combining the modified additional acceleration signal and the first named acceleration signal, and means for supplying the last named combination to the means for combining the linear and angular accelerometer outputs.

23. Apparatus as in claim 22 wherein said means for combining the linear and angular accelerometer outputs includes an operational amplifier and means for modifying the output of the operational amplifier with the secant of the angle between a vertical plane parallel to the direction of travel and the horizontal tilting axis, whereby the tilt angle as projected onto a vertical plane perpendicular to the direction of travel of the framework is maintained at the magnitude selected by control of the input reference signal.

24. Apparatus as in claim 22 wherein said means for supplying the combined linear acceleration signals to the means for combining the linear and angular accelerometer outputs is comprised of an error nulling amplifier in the form of a positive follower for reducing the susceptibility of the system to minute bias errors produced by the angular accelerometer, and a phase-lead network to prevent oscillation from positive feedback due to the combination of negative feedback and two ninety degree phase shifts in the double integration.

25. Apparatus as in claim 23 wherein said means for supplying sine and secant information is in the form of potentiometers mounted on said framework and having input shafts which are coupled to the blade so that they measure angular rotation of the blade about a nominally vertical axis.

26. Apparatus as in claim 22 together with means for attenuating the output of the combined first named and additional acceleration signals by approximately a 30 to 1 ratio at approximately 2.0 Hz.

27. Apparatus as in claim 21 wherein said means carried by the blade adapted to sense the external elevation reference includes means coupled to the blade and providing an output signal which represents the actual elevation position of the blade as determined by the second actuator, means mounted on the framework available to the operator for selecting an elevation reference command signal, and means for comparing the first named signal with the reference command signal to provide an error signal for causing operation of said second actuator.

28. In a method for controlling the tilting movement relative to a local horizontal reference of one part of a machine having a framework where the framework of the machine shifts its position relative to the reference as the machine moves relative to a surface, comprising the steps of providing a reference command signal for controlling the movement of said one part, sensing the resultant linear acceleration including the acceleration of gravity of said one part along an axis at right angles to the axis of tilting movement of said one part, sensing the angular acceleration of said one part about an axis parallel to the axis for tilting movement, obtaining fast response outputs from the angular accelerometer and slow response outputs from the linear accelerometer, combining the two last named outputs, comparing the combined output with the input command signal to provide an error signal, converting the error signal into a mechanical force and coupling the mechanical force to the one part for controlling the movement of said one part.

29. A method as in claim 28 together with the steps of measuring the linear acceleration of the framework in the direction of movement of the machine modifying the last named linear acceleration measurement by the sine of the angle between a vertical plane parallel to the direction of travel and the tilting axis and summing the modified linear acceleration measurement with the sensed acceleration at right angles to the axis of tilting movement thereby compensating for error from acceleration in the direction of machine movement.

30. A method as in claim 28 together with the step of modifying said combined fast and slow response outputs by the secant of the angle between a vertical plane parallel to the direction of movement of the machine and the tilting axis whereby a constant angle of tilt is maintained as projected onto a vertical plane perpendicular to the direction of movement.

31. A method as in claim 28 together with the step of providing attenuation of the linear acceleration signal in the frequency range of resonance of the machine to provide control system stability.

32. In a method for controlling the position of a moldboard about a tilt axis extending in a direction perpendicular to the long dimension of the moldboard being carried by a framework of a motor grader being adapted to travel on a surface, the position being referenced to a local horizontal plane, where said plane is defined as a plane perpendicular to the local long-term acceleration vector which includes the acceleration of gravity as a component, the method comprising the steps of providing an input command signal for controlling the position of the moldboard, sensing the motion of the moldboard by detecting angular acceleration about the tilt axis and linear acceleration along an axis extending at right angles to the tilt axis, compensating the linear acceleration output for error induced by framework acceleration along the direction of travel of the framework, combining the compensated linear acceleration output signal and the angular accelerometer output signal, filtering the linear acceleration output to provide a slow response output proportional to tilt angle, attenuating the slow response output in the frequency range of machine resonance, obtaining a fast response output proportional to tilt angle from the angular acceleration output, combining the slow and fast response outputs, obtaining a correction signal proportional to the secant of the angle between the tilt axis and a vertical plane parallel to the direction of travel of the framework, summing the correction signal with the combined slow and fast response outputs to insure maintenance of the commanded cross-grade angle as the tilt axis departs from a parallel to said vertical plane, comparing the summed signal with the input command signal to provide an error signal, converting the error signal into a mechanical force, and coupling the mechanical force to the moldboard for positioning the moldboard.

33. A method as in claim 32 wherein the step for providing compensation for linear accelerometer output error induced by framework acceleration along the direction of travel of the framework is comprised of sensing linear acceleration along the direction of travel of the framework, providing an additional linear acceleration output therefrom, sensing the sine of the angle between the vertical plane parallel to the direction of travel of the framework and the tilt axis, multiplying the sensed sine of the angle by the additional linear acceleration output thereby providing an output signal proportional to the sine of the angle, and combining the last named output signal with the first named linear accelerometer output.

34. In an angular position sensing system for detecting the angular position of a structural body referenced to earth's coordinates about at least one axis, a level sensor mounted to detect the angular position about said one axis of a plane referenced to local horizontal and producing an output related thereto, means for detecting angular motion about said one axis substantially solely sensitive to inertial angular motion and producing an output related thereto, means for combining the outputs from said level sensor and said means for detecting angular motion, said means for combining including means for accepting solely long term level sensor output and short term angular motion output and providing a continuous broad band output containing said long and short term outputs related to angular position, together with a platform mounted on the structural body, means for allowing rotation of said platform relative to the structural body about at least one axis, a device of the type which is to be stablized about said one axis mounted on the platform, means for providing a reference signal for said one axis indicative of a predetermined angular position of the structural body about said one axis, means for comparing the combined outputs with said reference signal for generating an error signal, and means for receiving said error signal, wherein said means for receiving said error signal includes means for applying torque about said one axis to urge said platform to assume said predetermined angular position.

35. An angular position sensing and stabilization system for detecting changes in angular position of a structural body relative to earth's coordinates, comprising a platform mounted on the structural body, means for allowing rotation of said platform relative to the structural body about at least one axis, a device of the type which is to be stabilized mounted on the platform, means for providing a reference signal for said one axis of rotation indicative of a predetermined angular position of said platform, means for sensing the rotational movement of said platform about said one axis of rotation and providing output responsive thereto, said last named means including a level sensor mounted on said platform producing an output indicative of deviation from local horizontal, means for detecting angular motion about said one axis substantially solely sensitive to inertial angular motion and providing an output related thereto, means for combining the outputs from said level sensor and said means for detecting angular motion, said means for combining including means for accepting solely long term level sensor output and short term angular motion output thereby providing a continuous broad band output related to angular position, means for comparing the combined outputs with said reference signal for said one axis of rotation for generating an error signal, means for receiving and converting said error signal to a torque, and means coupling said torque to said platform for causing rotation of said platform about said one axis of rotation to assume said predetermined angular position.

36. An angular position sensing system as in claim 35 wherein said level sensor comprises a linear accelerometer having a sensitive axis oriented perpendicular to said one axis of rotation for providing a steady state output signal responsive to rotational movement, wherein said means for detecting inertial angular motion comprises an angular accelerometer having a sensitive axis oriented parallel to said one axis of rotation for providing a transisent output signal responsive to rotational movement, wherein said means for combining includes a double integrator for receiving said transient output from said angular accelerometer, wherein said long term level sensor outputs are below a corner frequency and said short term angular motion outputs are above said corner frequency, and a phase lead network for receiving the output from said means for combining.

37. An angular position sensing system as in claim 35 wherein said level sensor comprises a linear accelerometer having a sensitive axis oriented perpendicular to said one axis of rotation for providing a steady state output signal responsive to rotational movement of said platform, wherein said means for detecting inertial angular motion comprises an angular velocity transducer having a sensitive axis oriented parallel to said one axis of rotation for providing a transient output signal responsive to rotational movement of said platform, wherein said means for combining include an integrator for receiving said transient output from said angular velocity transcucer, and wherein said long term level sensor outputs are below a corner frequency and said short term angular motion outputs are above said corner frequency.

38. An angular position sensing system as in claim 37 wherein said means for receiving and converting said error signal to a torque is a torque motor producing a torque vector substantially colinear with said one axis, and wherein said angular velocity transducer is a nongyroscopic device.

39. An angular position sensing system as in claim 36 adapted to receive an additional reference signal indicative of structural body azimuth, wherein said reference signal is indicative of local horizontal and wherein the structural body has a yaw axis together with means for allowing rotation of said platform about said yaw axis, means for providing an output indicative of platform azimuth, an additional angular accelerometer mounted on said platform having a sensitive axis aligned with the local vertical providing an output related to platform yaw axis angular acceleration, an additional double integrator for receiving said additional angular accelerometer output, producing an output related to yaw angle, an additional phase lead network for receiving said additional double integrator output, additional means for combining said additional phase corrected double integrator output and said output indicative of platform azimuth, said last named additional means rejecting said output indicative of platform azimuth above a specified frequency and rejecting said double integrator output below said specified frequency, means for comparing said additional combination with the additional reference signal for providing an azimuth error signal, and means for receiving said azimuth error signal for controlling said platform azimuth position.

40. An angular position sensing system as in claim 35 adapted to receive an additional reference signal indicative of structural body azimuth wherein said reference signal is indicative of local horizontal and wherein the structural body has a yaw axis together with means for allowing rotation of said platform about said yaw axis, means for providing an output indicative of platform azimuth, an angular velocity transducer having a sensitive axis oriented parallel to the local vertical mounted on said platform providing an output signal related to platform azimuth angular velocity, an integrator for receiving said angular velocity output providing an output related to yaw angle, additional means for combining said integrator output and said output indicative of platform azimuth, said last named additional means rejecting said output indicative of platform azimuth above a specified frequency and rejecting said integrator output below said specified frequency, means for comparing said additional combination with the additional reference signal for providing an azimuth error signal, and means for receiving said azimuth error signal for controlling said platform azimuth position.

41. An angular position sensing system as in claim 35 wherein said means for sensing rotational movement provides an additional signal related to angular velocity of said platform about said one axis of rotation, and wherein said means for receiving said error signal is a torque motor, said torque motor being connected to receive said additional signal, whereby said platform is damped as it is driven continuously towards zero error signal thereby preventing inter axis resonance.

42. An angular position sensing system as in claim 41 wherein said platform is controlled about two mutually perpendicular horizontal axes, and wherein said device to be stabilized is an additional linear accelerometer mounted on the platform having a sensitive axis aligned with the local vertical, said additional accelerometer providing an output indicative of vertical acceleration.

43. A stable platform as in claim 36 wherein said means for combining outputs comprises means for comparing the double integral of said transient output signal with said steady state output signal for providing an additional error signal, feedback means for connecting said additional error signal to the input of said double integrator for driving said double integrator output signal into coincidence with said steady state output signal.

44. In an attitude control system for controlling the tilting movement relative to a local horizontal reference of one part of an apparatus having a framework when the framework of the apparatus shifts its position relative to the reference, means carried on the apparatus for supplying an input reference command for control of movement of said one part, means mounted on the apparatus for receiving the input command, sensing means carried by said one part to sense the tilting movement of said part, said sensing means including a linear accelerometer having its sensitive axis at right angles to the axis of the tilting movement and an angular accelerometer with its sensitive axis parallel to the axis for tilting movement, means mounted on the apparatus for combining the outputs from the linear and angular accelerometers and comparing the combined outputs with the input command to supply an error signal therefrom, means mounted on the apparatus for receiving the error signal for converting the error signal to a mechanical force, and means coupling the mechanical force to said one part to cause tilting movement of said one part in accordance with the error signal.

45. An attitude control system as in claim 44 wherein said apparatus is of a type in which said one part is capable of being rotated about a vertical axis, together with means adapted to be mounted on the framework for detecting linear acceleration of the framework along the direction of shift of position of the apparatus and providing an electrical output related thereto, a sine function means receiving said last-named output for modifying the magnitude of said electrical output in accordance with the sine of the angle between a vertical plane parallel to the direction of shift of position and the axis of tilting movement and supplying said modified electrical output to said sensing means so as to compensate for error induced therein due to linear acceleration of the apparatus along the direction of shift of position of the apparatus when rotation of said one part aligns the sensitive axis of the linear accelerometer mounted thereon with a component of the direction of shift.

46. In an angular position sensing system for detecting the angular position of a body referenced to earth's coordinates about at least one axis, first sensing means mounted on the body to detect the long term angular position of the body about said one axis referenced to local horizontal and producing a first output related thereto, second sensing means mounted on the body for detecting the short term angular position of the body about said one axis and producing a second output related thereto, means for combining the first and second outputs to produce a combined angular position output, means for converting the combined output to a mechanical force, and means coupling said mechanical force to said body to cause movement of said body in accordance with the combined output.

47. An angular position sensing system as in claim 46 wherein said first sensing means comprises a linear accelerometer having a sensitive axis oriented perpendicular to said one axis, wherein said second sensing means includes an angular accelerometer having a sensitive axis oriented parallel to said one axis of rotation, and wherein said means for combining includes a double integrator for receiving said second output and producing output indicative of angular position.

48. An angular position sensing system as in claim 46 wherein said first sensing means comprises a linear accelerometer having a sensitive axis oriented perpendicular to said one axis of rotation and said second sensing means comprises an angular velocity transducer having a sensitive axis oriented parallel to said one axis of rotation, said means for combining the first and second outputs including an integrator for receiving said second output, said first outputs being below a corner frequency and said second outputs being above said corner frequency.

49. In apparatus for controlling the attitude relative to a local horizontal reference of a part of an apparatus having a framework supporting said part, while said framework is moveable relative to the reference, a linear accelerometer adapted to be mounted on said part with its sensitive axis at right angles to the axis of tilting movement for producing a first signal representing a slow response angular displacement of the part, means adapted to be mounted on said part and sensitive to rotational motion of the part for producing a second signal representing a fast response angular displacement of the part, means for combining the slow response and the fast response signals representing angular displacement, means for receiving said combined signal and producing a mechanical force, and means coupling said mechanical force to said part, whereby said part is servoed to said controlled attitude over a broad band of frequencies of angular displacement of said framework.

50. An angular position sensing apparatus for sensing the attitude of one part of a machine relative to a local reference as the machine changes attitude relative to the local reference, comprising a linear sensor for detecting angular deviation of the one part relative to the local reference and providing a first electrical output indicative thereof, an angular sensor for detecting angular motion of the one part relative to the local reference and providing a second electrical output indicative thereof, means for combining said first and second electrical outputs including means for suppressing said first electrical outputs above a predetermined intermediate frequency and means for suppressing said second electrical output below said predetermined intermediate frequency, whereby said combined output is substantially free of angular position error due to linear motion of said one part at frequencies above said intermediate frequency, means for receiving said combined output and producing a mechanical force, and means coupling said mechanical force to said one part, whereby said one part is controlled to assume a predetermined attitude over a broad band of frequencies of angular displacement of said machine.

* * * * *

UNITED STATES PATENT OFFICE
CERTIFICATE OF CORRECTION

PATENT NO. : 3,899,028
DATED : August 12, 1975
INVENTOR(S) : HAROLD D. MORRIS and FREDERICK J. SIGWORTH It is certified that error appears in the above-identified patent and that said Letters Patent are hereby corrected as shown below:

In Claim 1, next to last clause, following the words "means mounted on the machine for receiving the error signal for" the following should be added: "converting the error signal to a mechanical force,".

Signed and Sealed this ninth Day of March 1976

[SEAL]

Attest:

RUTH C. MASON
Attesting Officer

C. MARSHALL DANN
Commissioner of Patents and Trademarks